(12) United States Patent
Takata et al.

(10) Patent No.: US 12,284,466 B2
(45) Date of Patent: Apr. 22, 2025

(54) PROJECTION DEVICE, CONTROL METHOD, AND RECORDING MEDIUM

(71) Applicant: NEC Corporation, Tokyo (JP)

(72) Inventors: Koya Takata, Tokyo (JP); Hisashi Mizumoto, Tokyo (JP); Fujio Okumura, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 38 days.

(21) Appl. No.: 18/282,848

(22) PCT Filed: Feb. 10, 2022

(86) PCT No.: PCT/JP2022/005235
§ 371 (c)(1),
(2) Date: Sep. 19, 2023

(87) PCT Pub. No.: WO2022/201938
PCT Pub. Date: Sep. 29, 2022

(65) Prior Publication Data
US 2024/0171711 A1  May 23, 2024

(30) Foreign Application Priority Data
Mar. 22, 2021 (JP) .................... 2021-047562

(51) Int. Cl.
*H04N 9/31* (2006.01)

(52) U.S. Cl.
CPC ......... *H04N 9/3155* (2013.01); *H04N 9/3188* (2013.01)

(58) Field of Classification Search
CPC .. H04N 9/3188; H04N 9/3155; H04N 9/3161; H04N 9/315; H04B 10/11; G03B 21/00
See application file for complete search history.

(56) References Cited

U.S. PATENT DOCUMENTS

| 8,096,665 B2 * | 1/2012 | Bellis ............. G03B 21/008 345/3.4 |
| 10,038,880 B2 * | 7/2018 | Nishida ............. H04N 9/3164 |

(Continued)

FOREIGN PATENT DOCUMENTS

| JP | 2001-154263 A | 6/2001 |
| JP | 2020-076973 A | 5/2020 |

(Continued)

OTHER PUBLICATIONS

International Search Report for PCT Application No. PCT/JP2022/005235, mailed on May 10, 2022.

(Continued)

*Primary Examiner* — Vinh T Lam
(74) *Attorney, Agent, or Firm* — Sughrue Mion, PLLC

(57) ABSTRACT

A projection device includes a light source that emits parallel light, a spatial light modulator including a modulation part that modulates a phase of the parallel light emitted from the light source, a control unit that tiles the modulation part with tiles of at least two resolutions in which a phase image related to an image displayed by projection light being set, sets the phase image to each of the plurality of tiles that are tiled, and causes the light source to radiate the parallel light toward the modulation part in which the phase image is set; and, and a projection optical system that projects light modulated by the spatial light modulator as the projection light.

10 Claims, 30 Drawing Sheets

(56) References Cited

U.S. PATENT DOCUMENTS

| | | | |
|---|---|---|---|
| 10,070,106 B2* | 9/2018 | Ferri | H04N 9/3138 |
| 10,210,844 B2* | 2/2019 | Kollin | G03H 1/0005 |
| 11,016,379 B2* | 5/2021 | Yamasaki | G03B 21/14 |
| 11,392,014 B2* | 7/2022 | Kyosuna | G03B 21/2066 |
| 2012/0169752 A1 | 7/2012 | Kurozuka | |
| 2016/0379606 A1 | 12/2016 | Kollin et al. | |
| 2019/0206027 A1* | 7/2019 | Uemura | H04N 21/4402 |
| 2020/0150589 A1 | 5/2020 | Wengierow et al. | |
| 2020/0150590 A1 | 5/2020 | Christmas | |

FOREIGN PATENT DOCUMENTS

| | | |
|---|---|---|
| WO | 2008/087691 A1 | 7/2008 |
| WO | 2011/135848 A1 | 11/2011 |

OTHER PUBLICATIONS

English translation of Written opinion for PCT Application No. PCT/JP2022/005235, mailed on May 10, 2022.

\* cited by examiner

PROJECTION DEVICE, CONTROL METHOD, AND RECORDING MEDIUM

This application is a National Stage Entry of PCT/JP2022/005235 filed on Feb. 10, 2022, which claims priority from Japanese Patent Application 2021-047562 filed on Mar. 22, 2021, the contents of all of which are incorporated herein by reference, in their entirety.

TECHNICAL FIELD

The present disclosure relates to a projection device and the like used for spatial light communication.

BACKGROUND ART

By using optical spatial communication that transmits and receives an optical signal (also referred to as a spatial optical signal) propagating in a space, large-capacity and secure communication can be achieved.

PTL 1 discloses a projection device including a spatial light modulation element. The signal processing means converts the video signal into spatial phase information. The spatial light modulation element has the number of section columns larger than the number of pixel columns of an image to be displayed.

PTL 2 discloses a scanning type image display device that displays an image by scanning a laser beam. The device of PTL 2 displays an image by Lissajous scanning using a biaxial resonant micro-electro-mechanical-system (MEMS) mirror.

PTL 3 discloses a projection display device including a light modulation element in which a plurality of pixels is disposed in a line, a light scanning means that scans a light flux from the light modulation element, and a projection lens that projects the light flux from the light scanning means onto a screen face from an oblique direction. The light scanning means is disposed on or near the pupil plane of the projection lens. The device of PTL 3 displays a two-dimensional image on a screen face by optical scanning of the light scanning means. The device of PTL 3 adjusts the dimension of the projected image displayed on the screen face by changing the sampling method of each pixel of the light modulation element.

CITATION LIST

Patent Literature

PTL 1: WO 2008/087691 A1
PTL 2: WO 2011/135848 A1
PTL 3: JP 2001-154263 A

SUMMARY OF INVENTION

Technical Problem

In the method of PTL 1, by separating the diffracted light for image display and the 0th-order light, a high-definition image can be projected while the projection lens is omitted. When the technique of PTL 1 is applied to spatial light communication, a gap is generated between a plurality of dots constituting an image formed by projection light. Therefore, in the method of PTL 1, communication cannot be performed with a communication target that enters between dots.

In the method of PTL 2, a gap that can be generated between a plurality of dots constituting an image formed by projection light can be eliminated by Lissajous scanning using a biaxial resonant MEMS mirror. However, in the method of PTL 2, it is necessary to drive the mechanically operating the biaxial resonant MEMS mirror in order to fill the gap between the dots.

In the method of PTL 3, a gap that can be generated between a plurality of dots constituting a projected image displayed on a screen face can be eliminated by scanning a light flux from a light modulation element by a light scanning means. However, in the method of PTL 2, it is necessary to drive the light scanning means in order to fill the gap between the dots.

An object of the present disclosure is to provide a projection device or the like capable of complementing a gap between dots constituting an image displayed by projection light without using a mechanically operating mechanism.

Solution to Problem

A projection device according to an aspect of the present disclosure includes a light source that emits parallel light, a spatial light modulator including a modulation part that modulates a phase of the parallel light emitted from the light source, a control unit that tiles the modulation part with tiles of at least two resolutions in which a phase image related to an image displayed by projection light being set, sets the phase image to each of the plurality of tiles that are tiled, and causes the light source to radiate the parallel light toward the modulation part in which the phase image is set; and, and a projection optical system that projects light modulated by the spatial light modulator as the projection light.

A control method according to an aspect of the present disclosure includes tiling a modulation part of a spatial light modulator with tiles of at least two resolutions in which a phase image related to an image displayed by projection light being set, setting the phase image to each of the plurality of tiles that are tiled, and causing a light source to radiate parallel light toward the modulation part in which the phase image is set. A program according to an aspect of the present disclosure causes a computer to execute processing of tiling a modulation part of a spatial light modulator with tiles of at least two resolutions in which a phase image related to an image displayed by projection light being set, processing of setting the phase image to each of the plurality of tiles that are tiled, and processing of causing a light source to radiate parallel light toward the modulation part in which the phase image is set.

Advantageous Effects of Invention

According to the present disclosure, it is possible to provide a projection device or the like capable of complementing a gap between dots constituting an image displayed by projection light without using a mechanically operating mechanism.

EXAMPLE EMBODIMENT

Figure 1:
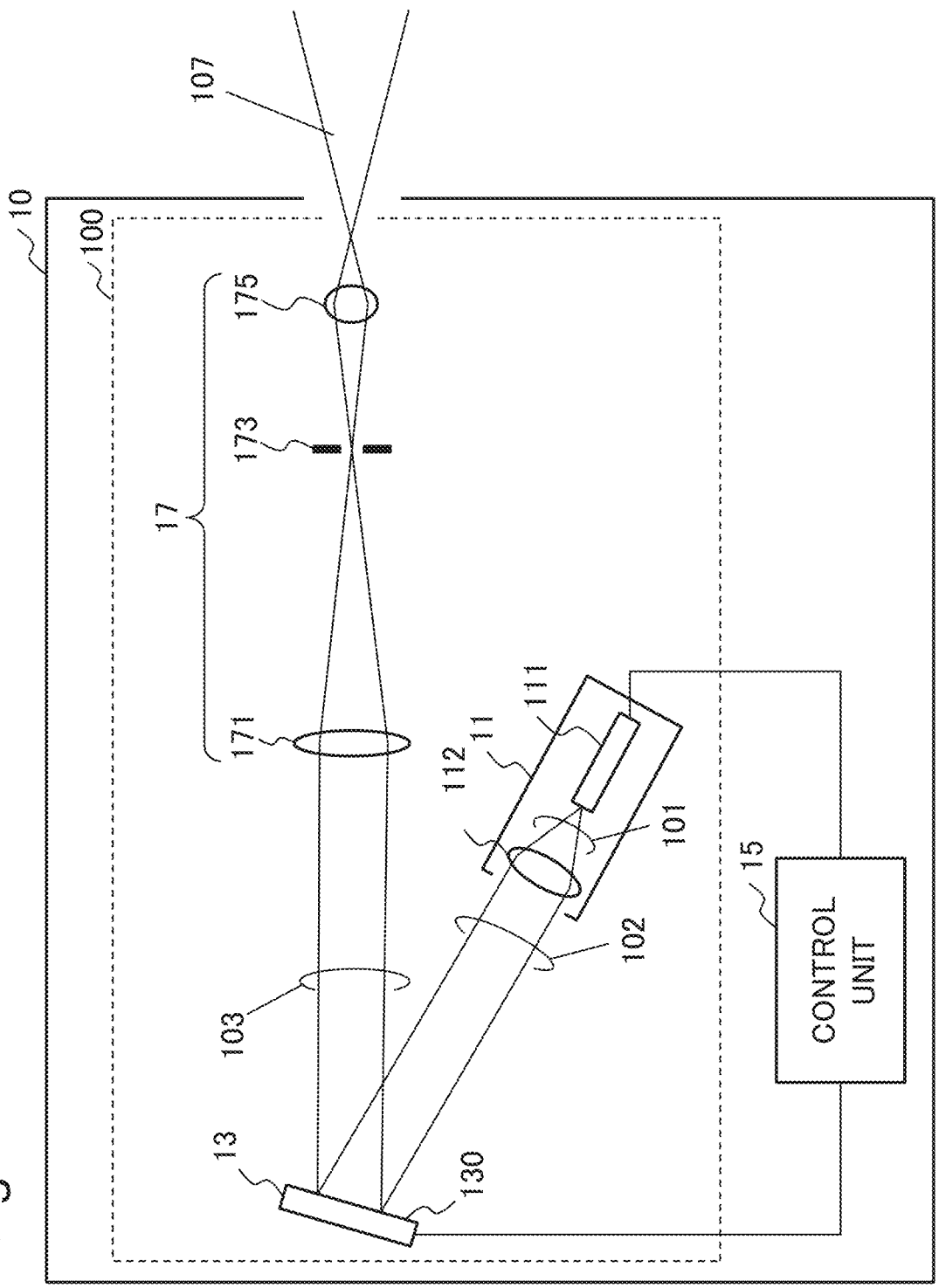
FIG. 1 is a conceptual diagram illustrating an example of a con[FIG.] Figuration of a projection device according to a first example embodiment.

Hereinafter, embodiments of the present invention will be described with reference to the drawings. However, the example embodiments described below have technically preferable limitations for carrying out the present invention, but the scope of the invention is not limited to the following. In all the drawings used in the following description of the example embodiment, the same reference numerals are given to the same parts unless there is a particular reason. In the following example embodiments, repeated description of similar configurations and operations may be omitted. The directions of the arrows in the drawings illustrate an example, and do not limit the directions of signals between blocks.

In all the drawings used for description of the following example embodiments, the directions of the arrows in the drawings are merely examples, and do not limit the directions of light and signals. A line indicating a trace of light in the drawings is conceptual, and does not accurately indicate an actual traveling direction or state of light. For example, in the following drawings, a change in a traveling direction or a state of light due to refraction, reflection, diffusion, or the like at an interface between air and a substance may be omitted, or a light flux may be expressed by one line.

First Example Embodiment

First, a projection device according to a first example embodiment will be described with reference to the drawings. The projection device of the present example embodiment is used for optical spatial communication in which an optical signal (hereinafter, also referred to as a spatial optical signal) propagating in a space is transmitted and received without using a medium such as an optical fiber, display of an image on a projection surface, distance measurement, and the like. The projection device of the present example embodiment may be used for applications other than optical spatial communication, image display, and distance measurement as long as it is used for projecting spatial light.
(Configuration)

FIG. 1 is a conceptual diagram illustrating an example of a configuration of a projection device 10 of the present example embodiment. The projection device 10 includes a light source 11, a spatial light modulator 13, a control unit 15, and a projection optical system 17. The light source 11, the spatial light modulator 13, and the projection optical system 17 constitute a projection unit 100. FIG. 1 is a view of an internal configuration of a projection device 10 when viewed in a lateral direction. FIG. 1 illustrates a line indicating a trace of light. FIG. 1 is conceptual, and does not accurately represent the positional relationship between the components, the traveling direction of light, and the like.

The light source 11 includes an emitter 111 and a collimator 112. The light source 11 converts laser light 101 emitted from the emitter 111 into parallel light 102 by the collimator 112 and emits the parallel light. The parallel light 102 emitted from the light source 11 travels toward a modulation part 130 of the spatial light modulator 13.

The emitter 111 emits the laser light 101 in a predetermined wavelength band under the control of the control unit 15. A wavelength of the laser light 101 emitted from the light source 11 is not particularly limited. For example, the emitter 111 emits the laser light 101 in the visible or infrared wavelength band. For example, in the case of near infrared rays of 800 to 900 nanometers (nm), the laser class can be increased, so that the sensitivity can be improved by about one digit as compared with other wavelength bands. For example, by using a gallium arsenide (GaN)-based laser light source, the infrared laser light 101 in a wavelength band of 1.55 micrometers (μm) can be emitted. For infrared rays in a wavelength band of 1.55 μm, a high-output laser light source of about 100 milliwatts (mW) can be used. The longer the wavelength of the laser light 101 is, the larger the diffraction angle can be made and the higher the energy can be set.

The collimator 112 converts the laser light 101 emitted from the emitter 111 into the parallel light 102. The laser light 101 emitted from the emitter 111 is converted into the parallel light 102 by the collimator 112, and emitted from the light source 11.

As illustrated in FIG. 1, the incident angle of the parallel light 102 is set non-perpendicular to the modulation part 130 of the spatial light modulator 13. An emission axis of the parallel light 102 emitted from the light source 11 is oblique to the modulation part 130 of the spatial light modulator 13. When the emission axis of the parallel light 102 is inclined with respect to the modulation part 130 of the spatial light modulator 13, the parallel light 102 can be incident without using a beam splitter. Therefore, light utilization efficiency can be improved. When the emission axis of the parallel light 102 is set inclined with respect to the modulation part 130 of the spatial light modulator 13, the size of the projection unit 100 can be made compact.

The spatial light modulator 13 includes the modulation part 130 irradiated with the parallel light 102. A pattern (also referred to as a phase image) related to a displayed image is set in the modulation part 130 of the spatial light modulator 13 under the control of the control unit 15. The parallel light 102 with which the modulation part 130 of the spatial light modulator 13 is irradiated is modulated according to the phase image set in the modulation part 130 and reflected by the modulation part 130. The light modulated by modulation part 130 (modulated light 103) travels toward the projection optical system 17. For example, the spatial light modulator 13 is achieved by a spatial light modulator using ferroelectric liquid crystal, homogeneous liquid crystal, vertical alignment liquid crystal, or the like. For example, the spatial light modulator 13 can be achieved by liquid crystal on silicon (LCOS). The spatial light modulator 13 may be achieved by a micro electro mechanical system (MEMS).

In the phase modulation-type spatial light modulator 13, the energy can be concentrated on the portion of the image by operating to switch the portion on which the projection light 107 is projected. Therefore, in the case of using the phase modulation-type spatial light modulator 13, when the output of the light source 11 is the same, the image can be displayed brighter than that of other methods.

Figure 2:
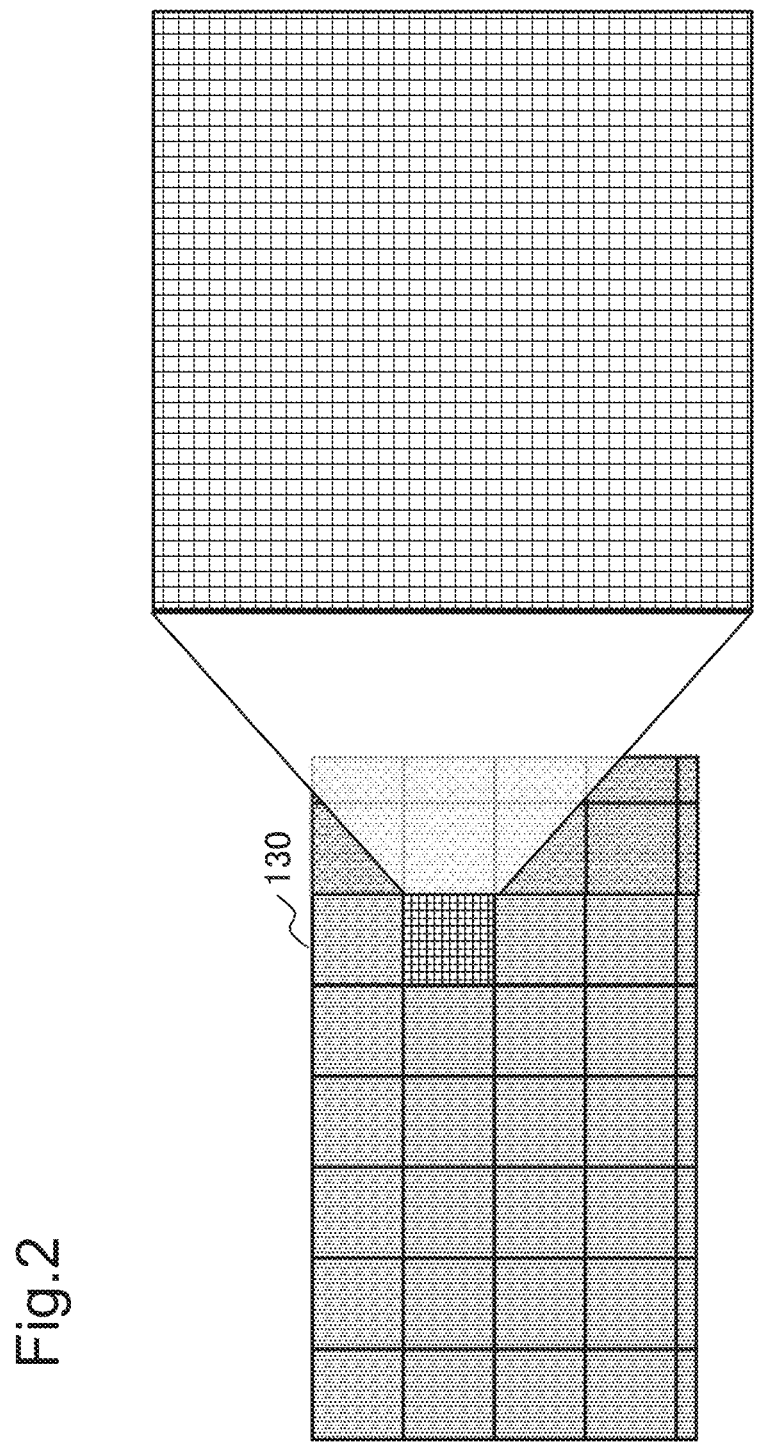
FIG. 2 is a conceptual diagram for explaining tiling of a modulation part of a spatial light modulator of the projection device according to the first example embodiment.

FIG. 2 is a conceptual diagram for describing region division (also referred to as tiling) of the modulation part 130 of the spatial light modulator 13 in general. The example of FIG. 2 relates to tiling that divides the modulation part 130 into a plurality of square regions (also referred to as tiles). In other words, in the example of FIG. 2, the modulation part 130 is divided into a plurality of regions having a horizontal and vertical aspect ratio of 1:1. A plurality of tiles to which a phase image generated by iterative Fourier transform or the like is assigned is set in the modulation part 130. In the case of the example of FIG. 2, the modulation part 130 of the spatial light modulator 13 is tiled using a plurality of phase images having the same resolution. Each of the plurality of tiles includes a plurality of pixels. For example, each of the plurality of tiles includes a plurality of pixels of m rows×n columns (m and n are natural numbers).

Hereinafter, a plurality of pixels of m rows×n columns may be referred to as m×n pixels. In the example of FIG. 2, a sufficient number of pixels are not allocated to the tiles at the right end and the lower end of the modulation part 130, but a similar phase image is set for the tiles. In the example of FIG. 2, the plurality of tiles is disposed in the modulation part 130 with the left end as a starting point, but the method of disposing the plurality of tiles in the modulation part 130 is not limited to the example of FIG. 2.

A phase image related to the projected image is displayed on each of the plurality of tiles. For example, each of the plurality of tiles includes 256×256 pixels or 512×512 pixels. In general tiling, in order to improve a calculation speed of a phase image, the number of pixels constituting a tile is set to an n-th power of 2 resolution (n is a natural number).

A phase image is tiled to each of the plurality of tiles allocated to the modulation part 130. For example, a phase image generated in advance is displayed on each of the plurality of tiles. When the modulation part 130 is irradiated with the parallel light 102 in a state where the phase images are set for the plurality of tiles, the modulated light 103 that forms an image related to the phase image of each tile is radiated.

The control unit 15 controls the light source 11 and the spatial light modulator 13. The control unit 15 sets a phase image related to the projected image in the modulation part 130 in accordance with the tiling set in the modulation part 130 of the spatial light modulator 13. For example, the control unit 15 sets, in the modulation part 130, a phase image related to an image according to a use such as image display, communication, or distance measurement. For example, the phase image of the projected image is stored in advance in a storage unit (not illustrated). The shape and the size of the image to be projected are not particularly limited. The control unit 15 drives the emitter 111 of the light source 11 in a state where the phase image related to the projected image is set in the modulation part 130. As a result, the parallel light 102 emitted from the light source 11 is radiated to the modulation part 130 of the spatial light modulator 13 in accordance with the timing at which the phase image is set in the modulation part 130 of the spatial light modulator 13. The parallel light 102 with which the modulation part 130 of the spatial light modulator 13 is irradiated is modulated by the modulation part 130 of the spatial light modulator 13. Modulated light 103 modulated by the modulation part 130 of the spatial light modulator 13 is projected as projection light 107 related to the pattern displayed on the modulation part 130 of the spatial light modulator 13.

The control unit 15 drives the spatial light modulator 13 in such a way that a parameter that determines a difference between a phase of the parallel light 102 with which the modulation part 130 of the phase modulation-type spatial light modulator 13 and a phase of the modulated light 103 reflected by the modulation part 130 changes. The parameter determining the difference between the phase of the parallel light 102 with which the modulation part 130 of the phase modulation-type spatial light modulator 13 is irradiated and the phase of the modulated light 103 reflected by the modulation part 130 is, for example, a parameter regarding optical characteristics such as a refractive index and an optical path length. For example, the control unit 15 changes the refractive index of the modulation part 130 by changing the voltage applied to the modulation part 130 of the spatial light modulator 13. When the refractive index of the modulation part 130 is changed, the parallel light 102 with which modulation part 130 is irradiated is appropriately diffracted based on the refractive index of each portion of the modulation part 130. That is, the phase distribution of the parallel light 102 with which the modulation part 130 of the phase modulation-type spatial light modulator 13 is irradiated is modulated according to the optical characteristics of the modulation part 130. A method of driving the spatial light modulator 13 by the control unit 15 is determined according to the modulation scheme of the spatial light modulator 13.

The projection optical system 17 is an optical system that projects the modulated light 103 modulated by the modulation part 130 of the spatial light modulator 13 as the projection light 107. As illustrated in FIG. 1, the projection optical system 17 includes a Fourier transform lens 171, an aperture 173, and a projection lens 175.

The Fourier transform lens 171 is an optical lens that forms an image formed when the modulated light 103 modulated by the spatial light modulator 13 is projected at infinity at a focus position near the aperture 173. A virtual lens may be used instead of the Fourier transform lens 171. In the case of using the virtual lens, a composite image of the phase image related to the image formed by the projection light 107 projected from the projection device 10 and the virtual lens image for condensing the modulated light 103 at the focus position in the vicinity of the aperture 173 may be set in the modulation part 130. When a virtual lens is used, the Fourier transform lens 171 is omitted. In the case of using the virtual lens, it is preferable to configure a 0th-order light removal unit that removes 0th-order light.

The aperture 173 is a frame that shields high-order light included in the light focused by the Fourier transform lens 171 and limits the outer edge of the display region. The opening of the aperture 173 is opened smaller than the outer periphery of the display region at the position of the aperture 173, and is installed in such a way as to block the peripheral region of the image at the position of the aperture 173. For example, the opening of the aperture 173 is formed in a rectangular shape or a circular shape. The aperture 173 is preferably installed at a focus position of the Fourier transform lens 171. The aperture 173 may be shifted from the focus position of the Fourier transform lens 171 as long as high-order light can be shielded and the display region can be limited. A portion that shields the 0th-order light included in the modulated light 103 may be provided inside the opening of the aperture 173.

The projection lens 175 is an optical lens that enlarges the light focused by the Fourier transform lens 171 in accordance with the image to be projected. The projection lens 175 may be constructed with a single lens or a lens in which a plurality of lenses is combined. For example, the projection lens 175 includes a free-form surface lens. The projection light 107 projected by the projection lens 175 is projected toward an any target.

[Tiling]

Next, tiling set in the modulation part 130 of the spatial light modulator 13 will be described with some examples. Hereinafter, general tiling (comparative example) and tiling (tiling example) according to the present example embodiment will be described.

First Comparative Example

Figure 3:
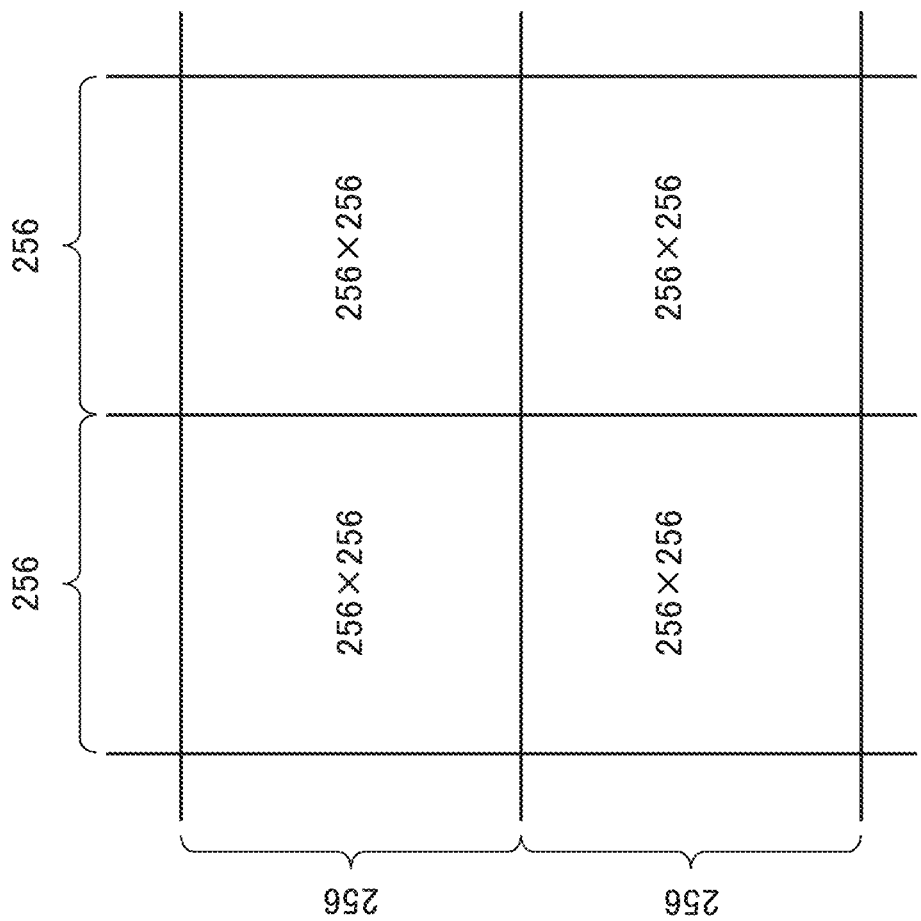
FIG. 3 is a conceptual diagram for explaining an example of tiling of a first comparative example in the modulation part of the spatial light modulator of the projection device according to the first example embodiment.
Figure 4:
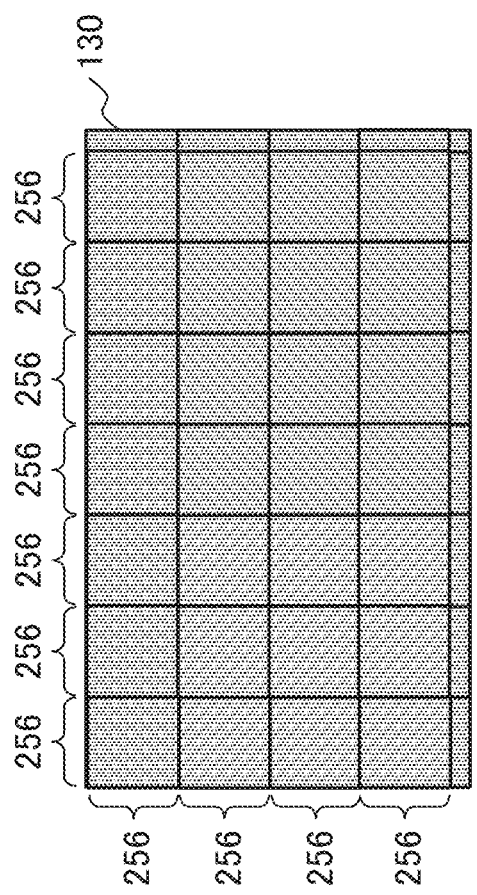
FIG. 4 is a conceptual diagram illustrating an example in which tiles are set in the modulation part of the spatial light modulator of the projection device according to the first example embodiment under the condition of the first comparative example.

FIG. 3 is a conceptual diagram for explaining an example of general tiling (first comparative example). FIG. 3 relates to tiling of part of the modulation part 130. In the example of FIG. 3, all the tiles are set to 256×256 pixels. FIG. 4 illustrates an example in which a plurality of tiles of 256×256 pixels is set in the modulation part 130 of 1080×1920 pixels. In the example of FIG. 4, a sufficient number of pixels are not allocated to the tiles at the right end and the lower end of the modulation part 130, but a similar phase image is set for the tiles. In the example of FIG. 4, the plurality of tiles is disposed in the modulation part 130 starting from the left end, but the method of disposing the plurality of tiles in the modulation part 130 is not limited to the example of FIG. 4.

Figure 5:
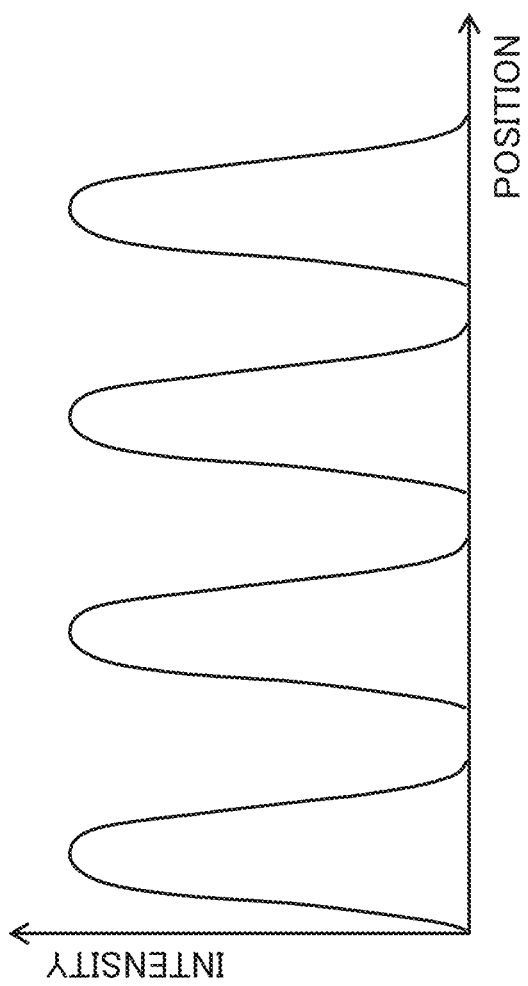
FIG. 5 is a graph illustrating an example of an intensity distribution of light of part of an image displayed by projection light projected in a case where tiles are set in the modulation part of the spatial light modulator of the projection device according to the first example embodiment under the condition of the first comparative example.
Figure 6:
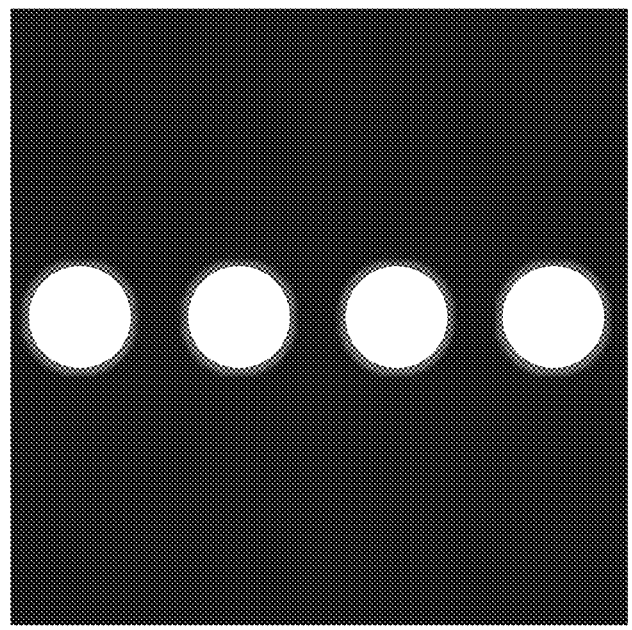
FIG. 6 is a conceptual diagram illustrating part of an image displayed by projection light projected in a case where tiles are set in the modulation part of the spatial light modulator of the projection device according to the first example embodiment under the condition of the first comparative example.

FIG. 5 is an example of an intensity distribution of light of part of an image displayed on a projection surface by the projection light 107 projected in a state where a plurality of tiles each having 256×256 pixels is set in the modulation part 130 of the spatial light modulator 13. FIG. 6 is a conceptual diagram of part of an image displayed by the projection light 107 projected under conditions set as in FIG. 5. In the examples of FIGS. 5 and 6, four dots are displayed on the projection surface. As illustrated in FIG. 6, gaps are formed between the four dots. As described above, in a case where the resolution is relatively low with about 256×256 pixels, when the phase image having the same resolution is set for each of the plurality of tiles allocated to the modulation part 130 of the spatial light modulator 13, gaps are formed between dots constituting the image to be displayed.

Second Comparative Example

Figure 7:
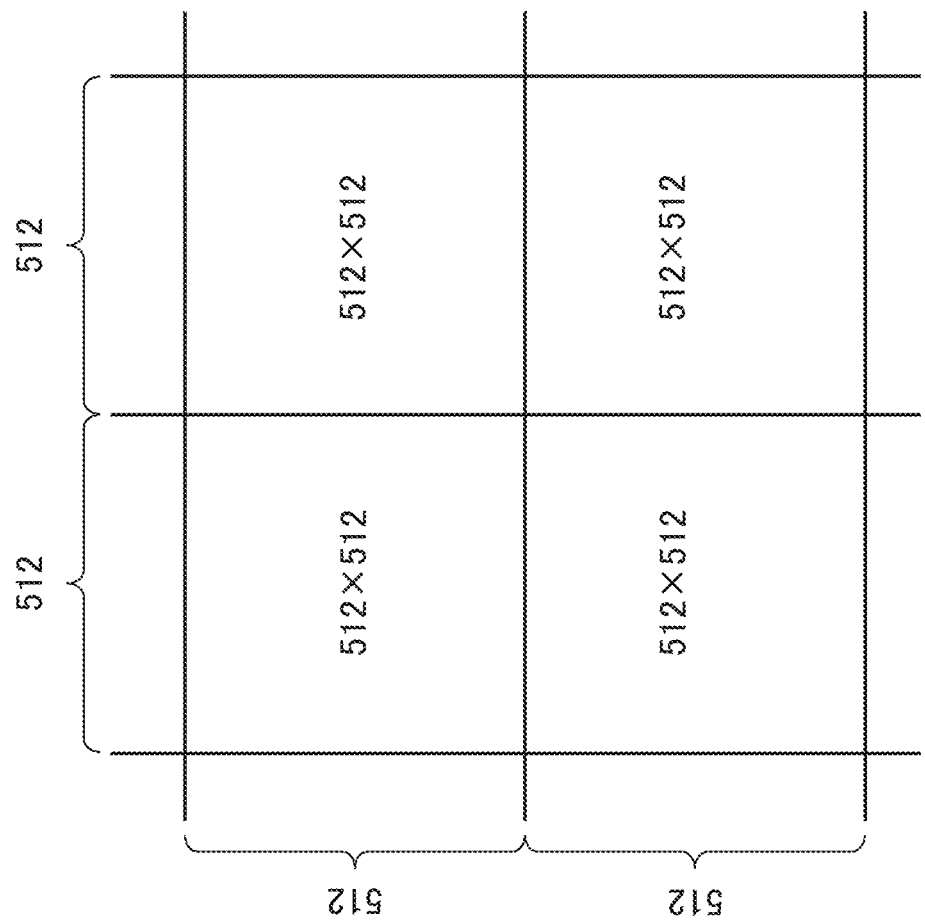
FIG. 7 is a conceptual diagram for describing an example of tiling of a second comparative example in the modulation part of the spatial light modulator of the projection device according to the first example embodiment.
Figure 8:
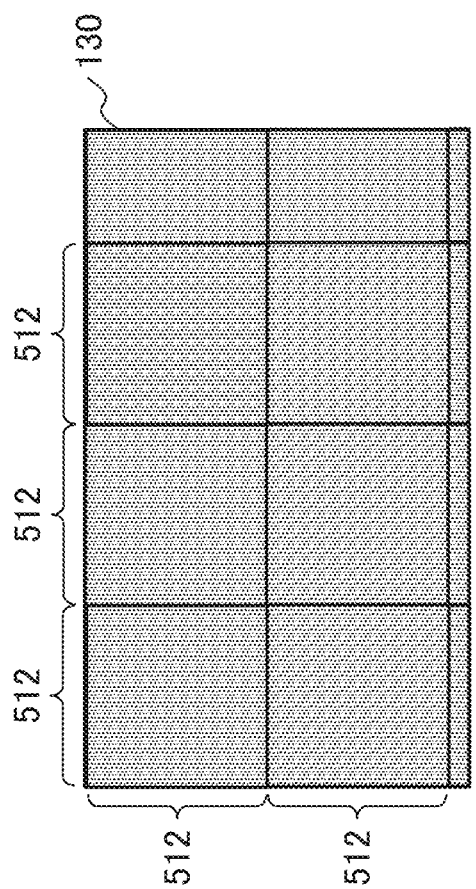
FIG. 8 is a conceptual diagram illustrating an example in which tiles are set in the modulation part of the spatial light modulator of the projection device according to the first example embodiment under the condition of the second comparative example.

FIG. 7 is a conceptual diagram for describing another example (second comparative example) of general tiling. The second comparative example attempts to complement gaps between dots by increasing the resolution. FIG. 7 relates to tiling of part of the modulation part 130. In the example of FIG. 7, all the tiles are set to have a higher resolution (512×512 pixels) as compared with the first comparative example (256×256 pixels). FIG. 8 illustrates an example in which tiles each having 512×512 pixels are set in the modulation part 130 of 1080×1920 pixels. In the example of FIG. 8, a sufficient number of pixels are not allocated to the tiles at the right end and the lower end of the modulation part 130, but a similar phase image is set for the tiles. In the example of FIG. 8, a plurality of tiles is disposed in the modulation part 130 with the left end as a starting point, but the method of disposing a plurality of tiles in the modulation part 130 is not limited to the example of FIG. 8.

Figure 9:
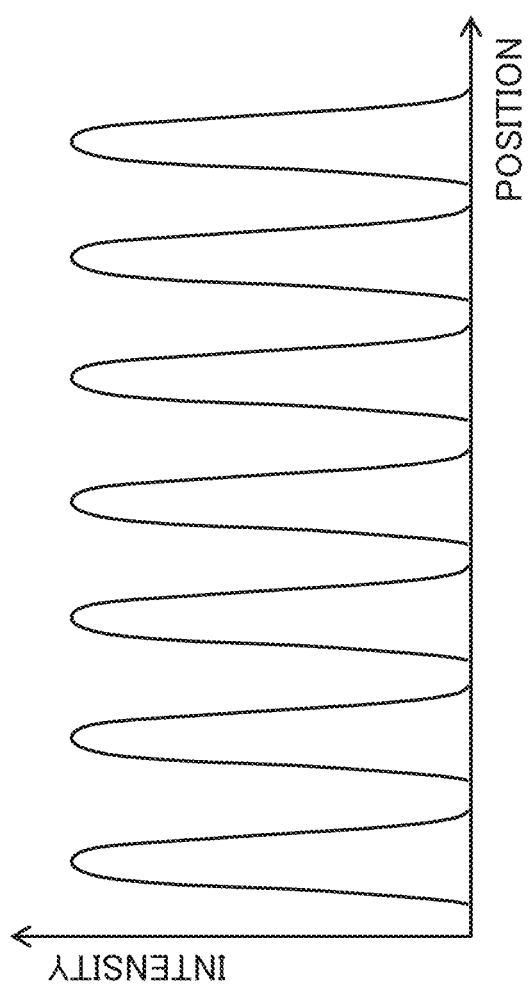
FIG. 9 is a graph illustrating an example of an intensity distribution of light of part of an image displayed by projection light projected in a case where tiles are set in the modulation part of the spatial light modulator of the projection device according to the first example embodiment under the condition of the second comparative example.
Figure 10:
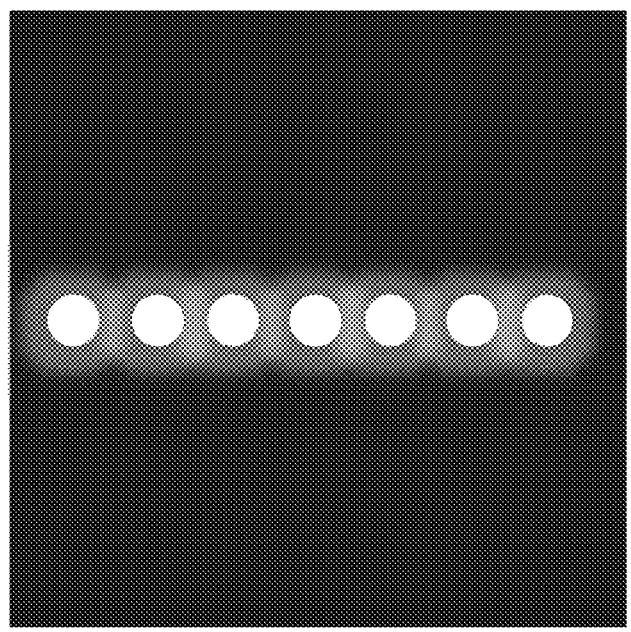
FIG. 10 is a conceptual diagram illustrating part of an image displayed by projection light projected in a case where tiles are set in the modulation part of the spatial light modulator of the projection device according to the first example embodiment under the condition of the second comparative example.

FIG. 9 is an example of an intensity distribution of light of part of an image displayed on a projection surface by the projection light 107 projected in a state where a plurality of tiles of 512×512 pixels is set in the modulation part 130 of the spatial light modulator 13. FIG. 10 is a conceptual diagram of part of an image displayed by the projection light 107 projected under conditions set as in FIG. 9. In the examples of FIGS. 9 and 10, seven dots are displayed on the projection surface. As illustrated in FIG. 10, even when the resolution is increased, gaps are formed between the seven dots. As illustrated in FIG. 10, when the resolution is increased, the periphery of the dot tends to be unclear. This is mainly because the number of tiles set in the modulation part 130 of the spatial light modulator 13 decreases by increasing the resolution. When the resolution is excessively increased, a dark spot may be formed at an unpredictable portion. That is, even when the resolution is simply increased, it is difficult to complement gaps between dots.

First Tiling Example

Figure 11:
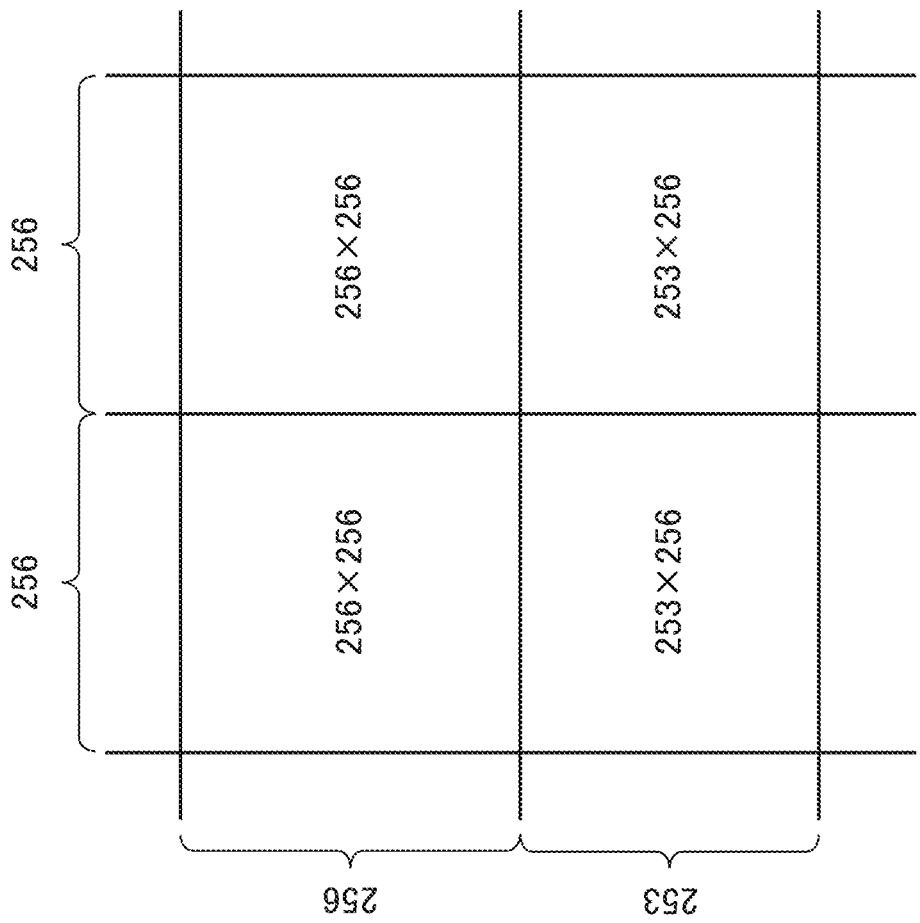
FIG. 11 is a conceptual diagram for describing a first tiling example in the modulation part of the spatial light modulator of the projection device according to the first example embodiment.
Figure 12:
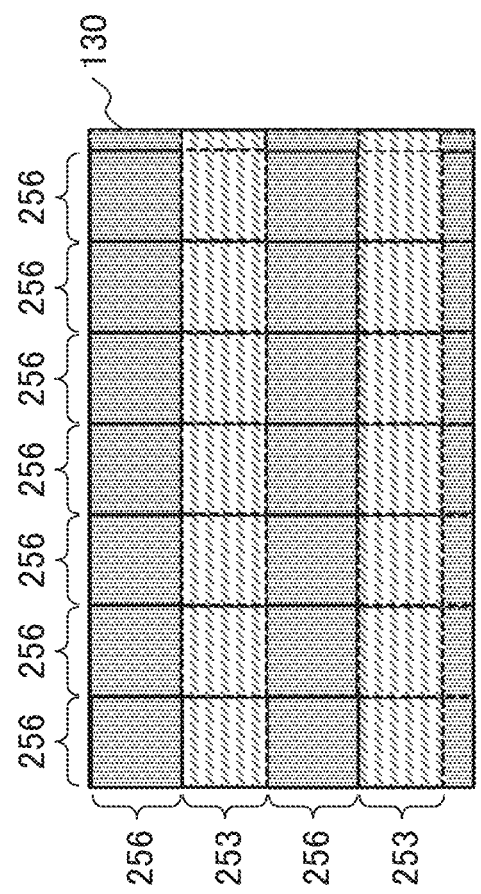
FIG. 12 is a conceptual diagram illustrating an example in which tiles are set in the modulation part of the spatial light modulator of the projection device according to the first example embodiment under the condition of the first tiling example.

FIG. 11 is a conceptual diagram for describing an example (first tiling example) of tiling according to the present example embodiment. FIG. 11 relates to tiling of part of the modulation part 130. In the example of FIG. 11, tiles each having 256 rows of pixels and tiles each having 253 rows of pixels are alternately set in the modulation part 130 of the spatial light modulator 13. That is, in the modulation part 130, rows of tiles each having 256×256 pixels and rows of tiles each having 253×256 pixels are alternately set. In this tiling example, a tile of 256×256 pixels is referred to as a tile of a first resolution, and a tile of 253×256 pixels is referred to as a tile of a second resolution. FIG. 12 illustrates an example in which rows of tiles of 256×256 pixels (first resolution) and rows of tiles of 253×256 pixels (second resolution) are alternately set in the modulation part 130 of 1080×1920 pixels. In the example of FIG. 12, a sufficient number of pixels are not allocated to the tiles at the right end and the lower end of the modulation part 130, but a similar phase image is set for the tiles. In the example of FIG. 12, a plurality of tiles is disposed in the modulation part 130 starting from the left end, but the method of disposing a plurality of tiles in the modulation part 130 is not limited to the example of FIG. 12.

Figure 13:
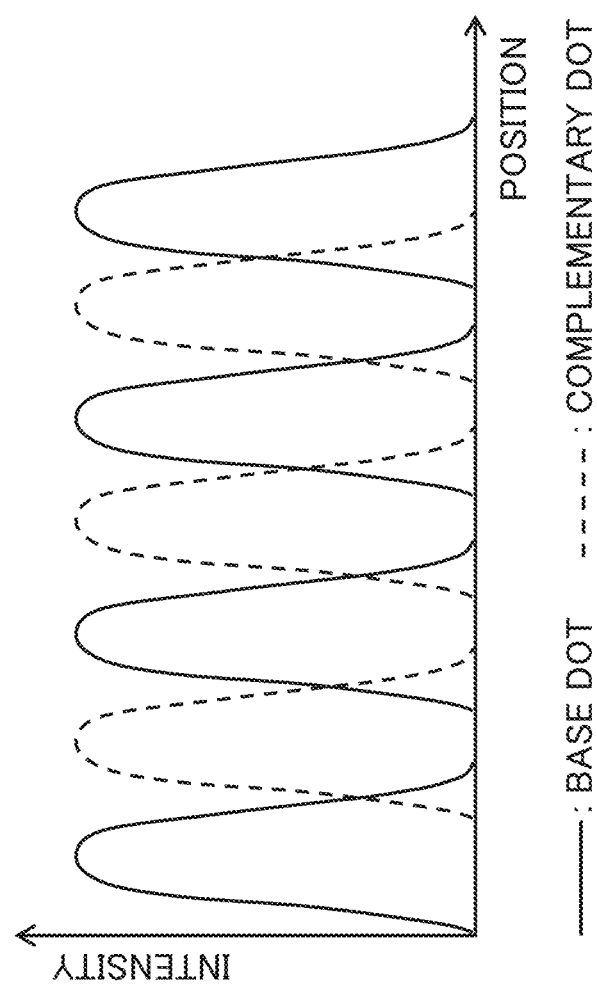
FIG. 13 is a graph illustrating an example of an intensity distribution of light of part of an image displayed by projection light projected in a case where tiles are set in the modulation part of the spatial light modulator of the projection device according to the first example embodiment under the condition of the first tiling example.
Figure 14:
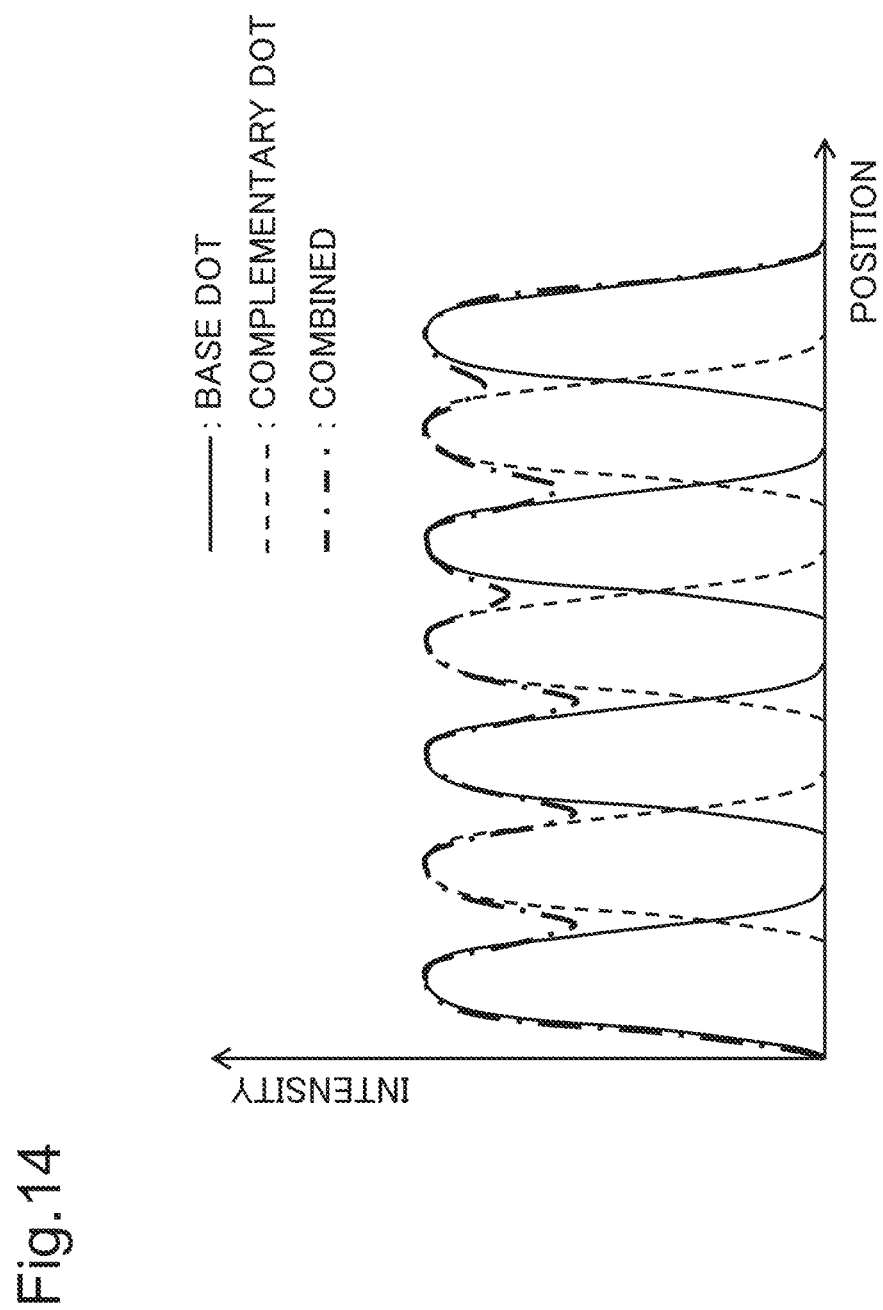
FIG. 14 is a graph illustrating an example of an intensity distribution of light of part of an image actually displayed by projection light projected in a case where tiles are set in the modulation part of the spatial light modulator of the projection device according to the first example embodiment under the condition of the first tiling example.
Figure 15:
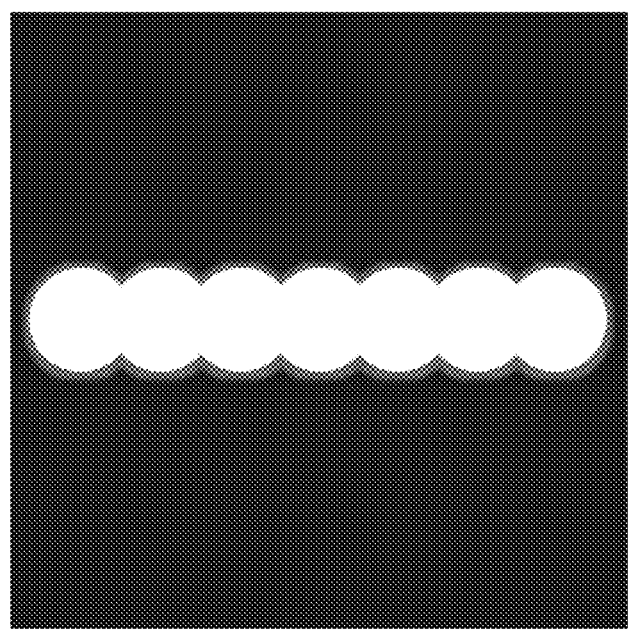
FIG. 15 is a conceptual diagram illustrating part of an image displayed by projection light projected in a case where tiles are set in the modulation part of the spatial light modulator of the projection device according to the first example embodiment under the condition of the first tiling example.

FIG. 13 illustrates an example of the intensity distribution of the light of the part of the image displayed on the projection surface by the projection light 107 projected in a state where a plurality of tiles each having 256×256 pixels (first resolution) and a plurality of tiles each having 253×256 pixels (second resolution) are set in the modulation part 130 of the spatial light modulator 13. In the example of FIG. 13, the waveform of the base dots derived from the tiles each having 256×256 pixels (first resolution) is indicated by a solid line, and the waveform of the complementary dots derived from the tiles each having 253×256 pixels (second resolution) is indicated by a broken line. FIG. 14 illustrates a waveform obtained by combining the waveform (solid line) of base dots derived from tiles each having 256×256 pixels (first resolution) and the waveform (broken line) of complementary dots derived from tiles each having 253×256 pixels (second resolution). In FIG. 14, a waveform obtained by combining phases of the base dots (solid line) and the complementary dots (broken line) is indicated by a one-dot chain line. FIG. 15 is a conceptual diagram of part of an image displayed by the projection light 107 projected under conditions set as in FIG. 14. In the example of FIG. 15, base dots derived from tiles each having 256×256 pixels (first resolution) are complemented by complementary dots derived from tiles each having 253×256 pixels (second resolution), and gaps between the base dots are filled. As a result, the gaps between the base dots are complemented by the complementary dots, and an image without a gap in the vertical direction is displayed. As described above, according to the examples of FIGS. 11 to 15, by tiling the modulation part 130 of the spatial light modulator 13 using the phase images of the first resolution and the second resolution, it is possible to fill the gaps between the dots constituting the image to be displayed.

Second Tiling Example

Figure 16:
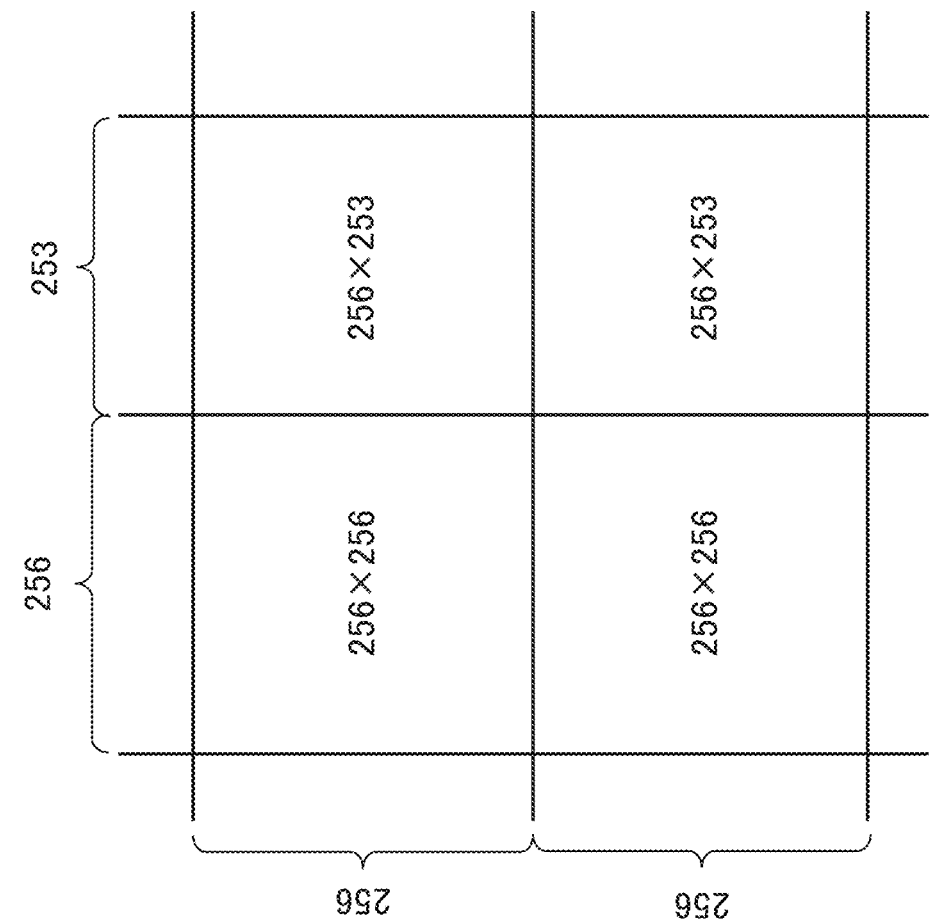
FIG. 16 is a conceptual diagram for describing a second tiling example in the modulation part of the spatial light modulator of the projection device according to the first example embodiment.
Figure 17:
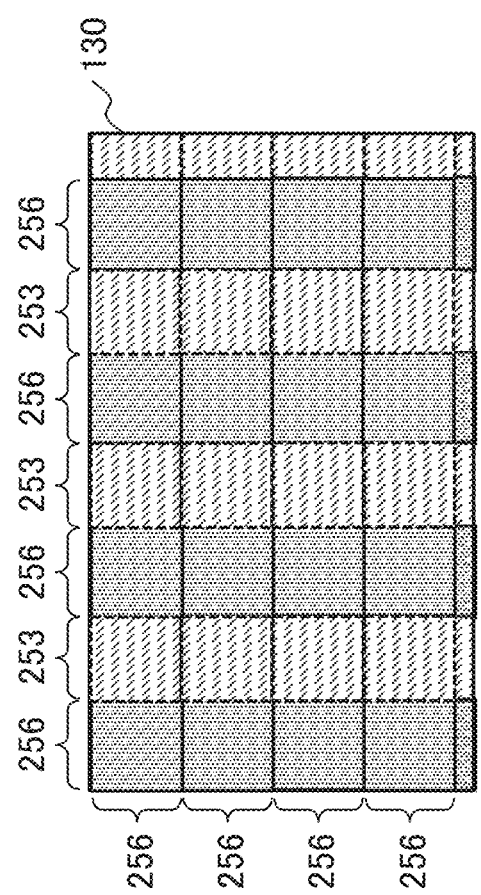
FIG. 17 is a conceptual diagram illustrating an example in which tiles are set in the modulation part of the spatial light modulator of the projection device according to the first example embodiment under the condition of the second tiling example.

FIG. 16 is a conceptual diagram for describing another example (the second tiling example) of tiling according to the present example embodiment. FIG. 16 relates to tiling of part of the modulation part 130. In the example of FIG. 16, tiles each having 256 columns of pixels and tiles each having 253 columns of pixels are alternately set in the modulation part 130 of the spatial light modulator 13. That is, in the modulation part 130, columns of tiles each having 256×256 pixels and columns of tiles each having 256×253 pixels are alternately set. Hereinafter, a tile of 256×256 pixels is referred to as a tile of a first resolution, and a tile of 256×253 pixels is referred to as a tile of a third resolution. FIG. 17 illustrates an example in which columns of tiles each having 256×256 pixels (first resolution) and columns of tiles each having 256×253 pixels (third resolution) are alternately set in the modulation part 130 of 1080×1920 pixels. In the example of FIG. 17, a sufficient number of pixels are not allocated to the tiles at the right end and the lower end of the modulation part 130, but a similar phase image is set for the tiles. In the example of FIG. 17, a plurality of tiles is disposed in the modulation part 130 starting from the left end, but the method of disposing a plurality of tiles in the modulation part 130 is not limited to the example of FIG. 17.

Figure 18:
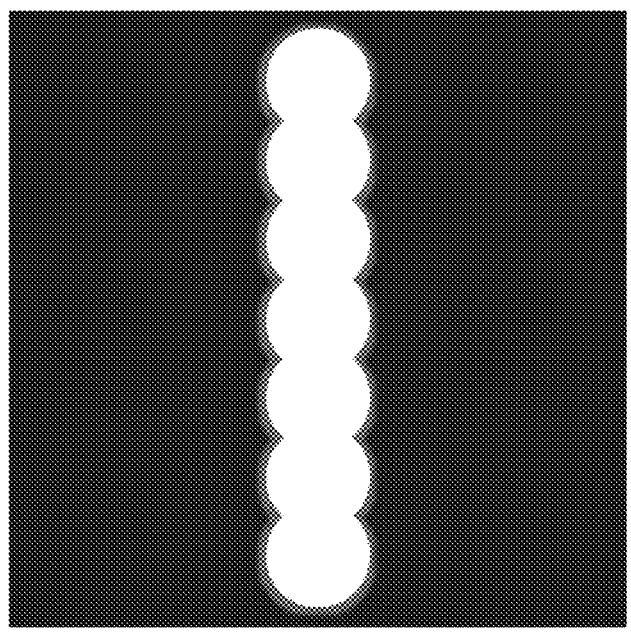
FIG. 18 is a conceptual diagram illustrating part of an image displayed by projection light projected in a case where tiles are set in the modulation part of the spatial light modulator of the projection device according to the first example embodiment under the condition of the second tiling example.

FIG. 18 is a conceptual diagram of part of an image displayed by the projection light 107 projected under conditions set as in FIG. 17. In the example of FIG. 18, base dots derived from tiles each having 256×256 pixels (first resolution) are complemented by complementary dots derived from tiles each having 256×253 pixels (third resolution), and gaps between the base dots are filled. As a result, the gaps between the base dots are complemented by the complementary dots, and an image without a gap in the horizontal direction is displayed. As described above, according to the examples of FIGS. 16 to 18, by tiling the modulation part 130 of the spatial light modulator 13 using the phase images of the first resolution and the third resolution, it is possible to fill the gaps between the dots constituting the image to be displayed.

Third Tiling Example

Figure 19:
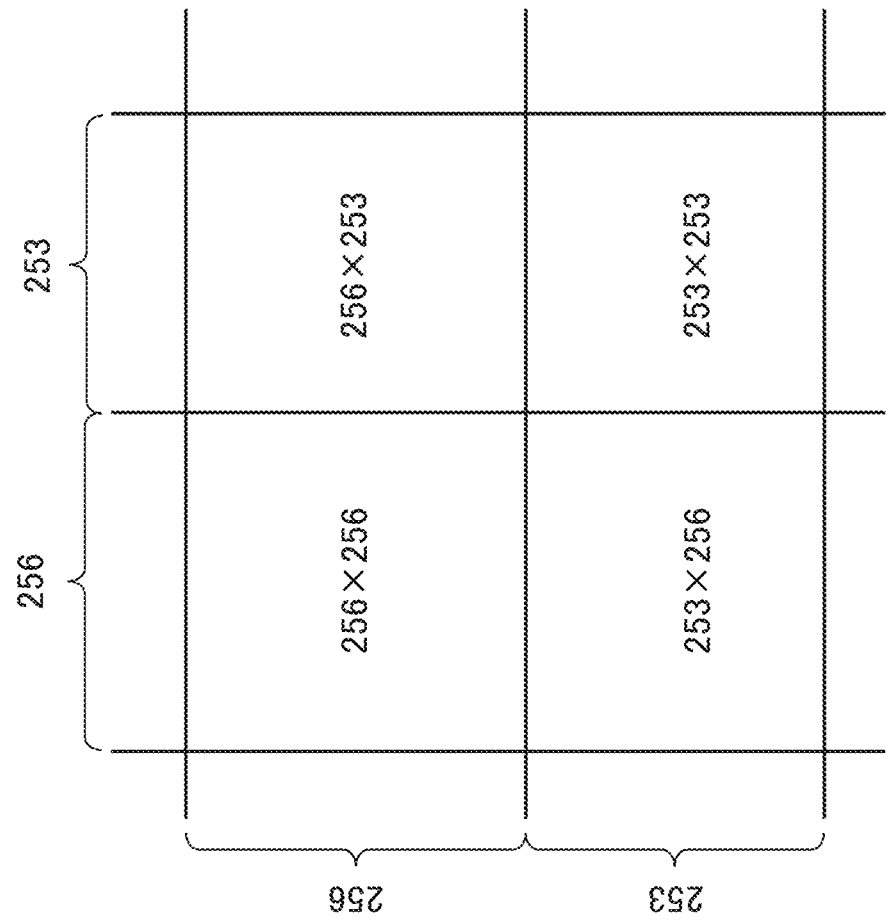
FIG. 19 is a conceptual diagram for describing a third tiling example in the modulation part of the spatial light modulator of the projection device according to the first example embodiment.
Figure 20:
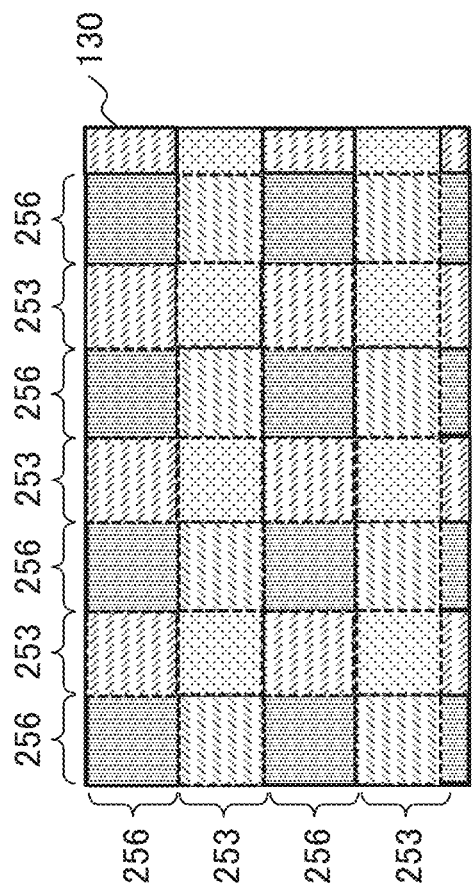
FIG. 20 is a conceptual diagram illustrating an example in which tiles are set in the modulation part of the spatial light modulator of the projection device according to the first example embodiment under the condition of the third tiling example.

FIG. 19 is a conceptual diagram for describing another example (third tiling example) of tiling according to the present example embodiment. FIG. 19 relates to tiling of part of the modulation part 130. In the example of FIG. 19, tiles each having 256 rows of pixels and tiles each having 253 rows of pixels are alternately set in the modulation part 130 of the spatial light modulator 13. In the example of FIG. 19, tiles each having 256 columns of pixels and tiles each having 253 columns of pixels are alternately set in the modulation part 130 of the spatial light modulator 13. That is, tiles each having 256×256 pixels, tiles each having 256×253 pixels, tiles each having 253×256 pixels, and tiles each having 253×253 pixels are set in the modulation part 130. Hereinafter, a tile of 256×256 pixels is referred to as a tile of the first resolution, a tile of 253×256 pixels is referred to as a tile of the second resolution, a tile of 256×253 pixels is referred to as a tile of the third resolution, and a tile of 253×253 pixels is referred to as a tile of the fourth resolution. FIG. 20 illustrates an example in which tiles each having 256×256 pixels (first resolution), tiles each having 253×256 pixels (second resolution), tiles each having 256×253 pixels (third resolution), and tiles each having 253×253 pixels (fourth resolution) are set in the modulation part 130 of 1080×1920 pixels. In the example of FIG. 20, a sufficient number of pixels are not allocated to the tiles at the right end and the lower end of the modulation part 130, but a similar phase image is set for the tiles. In the example of FIG. 20, a plurality of tiles is disposed in the modulation part 130 starting from the left end, but the method of disposing a plurality of tiles in the modulation part 130 is not limited to the example of FIG. 20.

Figure 21:
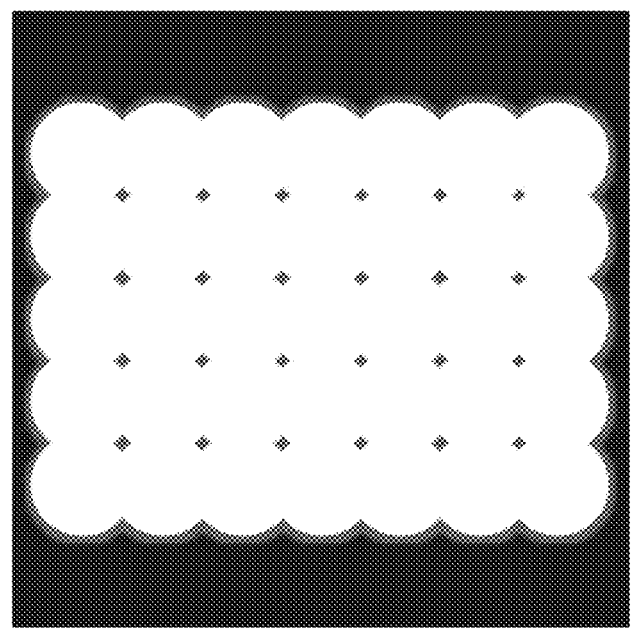
FIG. 21 is a conceptual diagram illustrating part of an image displayed by projection light projected in a case where tiles are set in the modulation part of the spatial light modulator of the projection device according to the first example embodiment under the condition of the third tiling example.

FIG. 21 is a conceptual diagram of part of an image displayed by the projection light 107 projected under conditions set as in FIG. 19. In the example of FIG. 21, the base dots derived from the tiles each having 256×256 pixels (first resolution) are complemented by complementary dots derived from the tiles each having 253×256 pixels (second resolution), 256×253 pixels (third resolution), and 253×253 pixels (fourth resolution), and gaps between the base dots are filled. As a result, the gaps between the base dots are complemented by the complementary dots, and an image in which the gaps are reduced in the horizontal direction and the vertical direction is displayed. As described above, according to the examples of FIGS. 19 to 21, tiling the modulation part 130 of the spatial light modulator 13 using the phase images of the first to fourth resolutions makes it possible to reduce the gap between the dots constituting the image to be displayed.

As described above, the projection device according to the present example embodiment includes the light source, the spatial light modulator, the control unit, and the projection optical system. The light source, the spatial light modulator, and the projection optical system constitute a projection unit. The light source emits parallel light. The spatial light modulator includes a modulation part that modulates the phase of the parallel light emitted from the light source. The control unit tiles the modulation part with tiles of at least two resolutions in which a phase image related to an image displayed by projection light being set. The control unit sets the phase image to each of the plurality of tiles that are tiled. The control unit causes the light source to radiate the parallel light toward the modulation part in which the phase image is set. The projection optical system projects light modulated by the spatial light modulator as projection light.

According to the projection device of the present example embodiment, by adjusting the resolutions of the plurality of tiles set in the spatial light modulator, it is possible to complement gaps between the dots constituting the image displayed by the projection light without using the mechanism that operates mechanically.

In an aspect of the present example embodiment, the control unit sets, in the modulation part of the spatial light modulator, a plurality of tiles of a first resolution, each of the tiles of the first resolution having a same number of rows and columns, and a plurality of tiles of a second resolution, each of the tiles of the second resolution having a different number of rows from the each of the tiles of the first resolution. According to the present aspect, it is possible to complement gaps in the vertical direction between the dots constituting the image displayed by the projection light.

In an aspect of the present example embodiment, the control unit sets, in the modulation part of the spatial light modulator, a plurality of tiles of a first resolution, each of the tiles of the first resolution having a same number of rows and columns, and a plurality of tiles of a third resolution, each of the tiles of the third resolution having a different number of columns from the each of the tiles of the first resolution. According to the present aspect, it is possible to complement gaps in the horizontal direction between the dots constituting the image displayed by the projection light.

In an aspect of the present example embodiment, the control unit sets, in the modulation part of the spatial light modulator, a plurality of tiles of the first resolution, a plurality of tiles of the second resolution, a plurality of tiles of the third resolution, and a plurality of tiles of the fourth resolution. Each of the plurality of tiles of the first resolution has a same number of rows and columns. The plurality of tiles of the second resolution has a different number of rows from the plurality of tiles of the first resolution. The plurality of tiles of the third resolution has a different number of columns from the plurality of tiles of the first resolution. The plurality of tiles of the fourth resolution has a different number of rows and a different number of columns from the plurality of tiles of the first resolution. According to the present aspect, it is possible to complement gaps in the vertical direction and the horizontal direction between the dots constituting an image displayed by projection light.

Second Example Embodiment

Next, a projection device according to a second example embodiment will be described with reference to the drawings. A projection device according to the present example embodiment includes a projection lens that enlarges and projects projection light at different magnification factors in a horizontal direction and a vertical direction. Hereinafter, an example of combining two cylindrical lenses will be described.

(Configuration)

Figure 22:
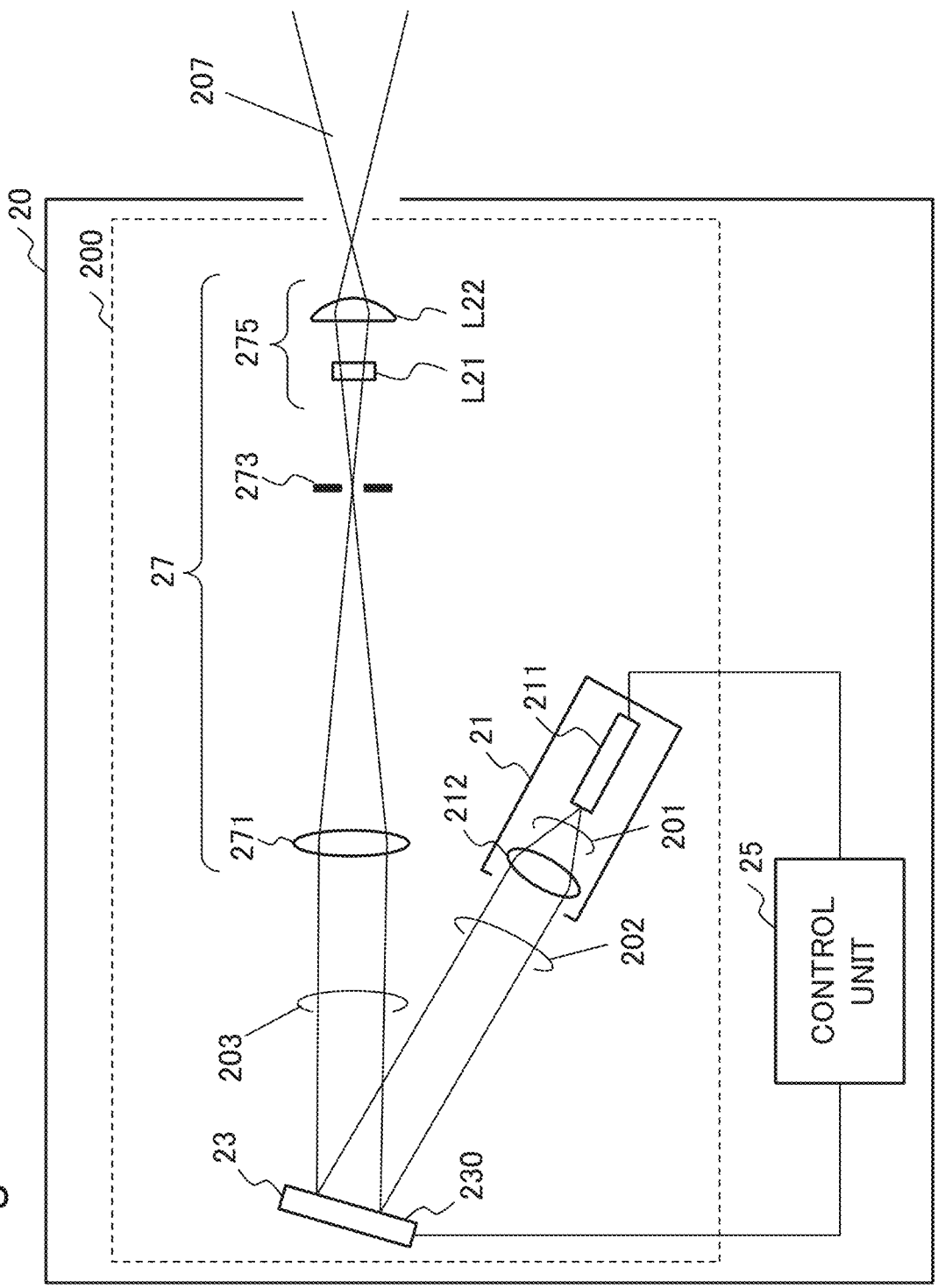
FIG. 22 is a conceptual diagram illustrating an example of a con[FIG.] Figuration of a projection device according to a second example embodiment.

FIG. 22 is a conceptual diagram illustrating an example of a configuration of a projection device 20 of the present example embodiment. The projection device 20 includes a light source 21, a spatial light modulator 23, a control unit 25, and a projection optical system 27. The light source 21, the spatial light modulator 23, and the projection optical system 27 constitute a projection unit 200. FIG. 22 is a view of the internal configuration of the projection device 20 when viewed in a lateral direction. FIG. 22 illustrates a line indicating a trace of light. FIG. 22 is conceptual, and does not accurately represent the positional relationship between the components, the traveling direction of light, and the like.

The light source 21 includes an emitter 211 and a collimator 212. Each of the light source 21, the emitter 211, and the collimator 212 has a configuration similar to that of each of the light source 11, the emitter 111, and the collimator 112 of the first example embodiment. The emitter 211 emits laser light 201 in a predetermined wavelength band under the control of the control unit 25. The collimator 212 converts the laser light 201 emitted from emitter 211 into parallel light 202. The laser light 201 emitted from the emitter 211 is converted into the parallel light 202 by the collimator 212, and emitted from the light source 21. The parallel light 202 emitted from the light source 21 travels toward a modulation part 230 of the spatial light modulator 23.

The spatial light modulator 23 includes the modulation part 230 irradiated with the parallel light 202. The spatial light modulator 23 has a configuration similar to that of the spatial light modulator 13 of the first example embodiment. The modulation part 230 of the spatial light modulator 23 is divided into regions (also referred to as tiling) according to the resolution of the image to be displayed. A pattern (also referred to as a phase image) related to an image to be displayed is set to each of the plurality of tiles set in the modulation part 230 under the control of the control unit 25.

The control unit 25 controls the light source 21 and the spatial light modulator 23. The control unit 25 has a configuration similar to that of the control unit 15 of the first example embodiment. The control unit 25 sets a phase image related to the projected image in the modulation part 230 in accordance with the tiling set in the modulation part 230 of the spatial light modulator 23. In other words, the control unit 25 sets, in the modulation part 230 of the spatial light modulator 23, a plurality of tiles in which the number of pixels in the direction perpendicular to the direction in which the image displayed by the projection light projected by the projection lens 275 is expanded is adjusted. The control unit 25 drives the emitter 211 of the light source 21 in a state where the phase image related to the projected image is set in the modulation part 230. As a result, the parallel light 202 emitted from the light source 21 is radiated to the modulation part 230 of the spatial light modulator 23 in accordance with the timing at which the phase image is set in the modulation part 230 of the spatial light modulator 23. The parallel light 202 with which the modulation part 230 of the spatial light modulator 23 is irradiated is modulated by the modulation part 230 of the spatial light modulator 23. Modulated light 203 modulated by the modulation part 230 of the spatial light modulator 23 is projected as projection light 207 related to the pattern displayed on the modulation part 230 of the spatial light modulator 23.

The projection optical system 27 is an optical system that projects the modulated light 203 modulated by the modulation part 230 of the spatial light modulator 23 as the projection light 207. The projection optical system 27 changes the aspect ratio of an image formed by the phase image set in the modulation part 230 of the spatial light modulator 23 and projects the image. As illustrated in FIG. 22, the projection optical system 27 includes a Fourier transform lens 271, an aperture 273, and a projection lens 275.

The Fourier transform lens 271 is an optical lens that forms an image formed when the modulated light 203 modulated by the spatial light modulator 23 is projected at infinity at a focus position near the aperture 273. The Fourier transform lens 271 has a configuration similar to that of the Fourier transform lens 171 of the first example embodiment.

The aperture 273 is a frame that shields high-order light included in the light focused by the Fourier transform lens 271 and limits the outer edge of the display region. The aperture 273 has a configuration similar to that of the aperture 173 of the first example embodiment.

Figure 23:
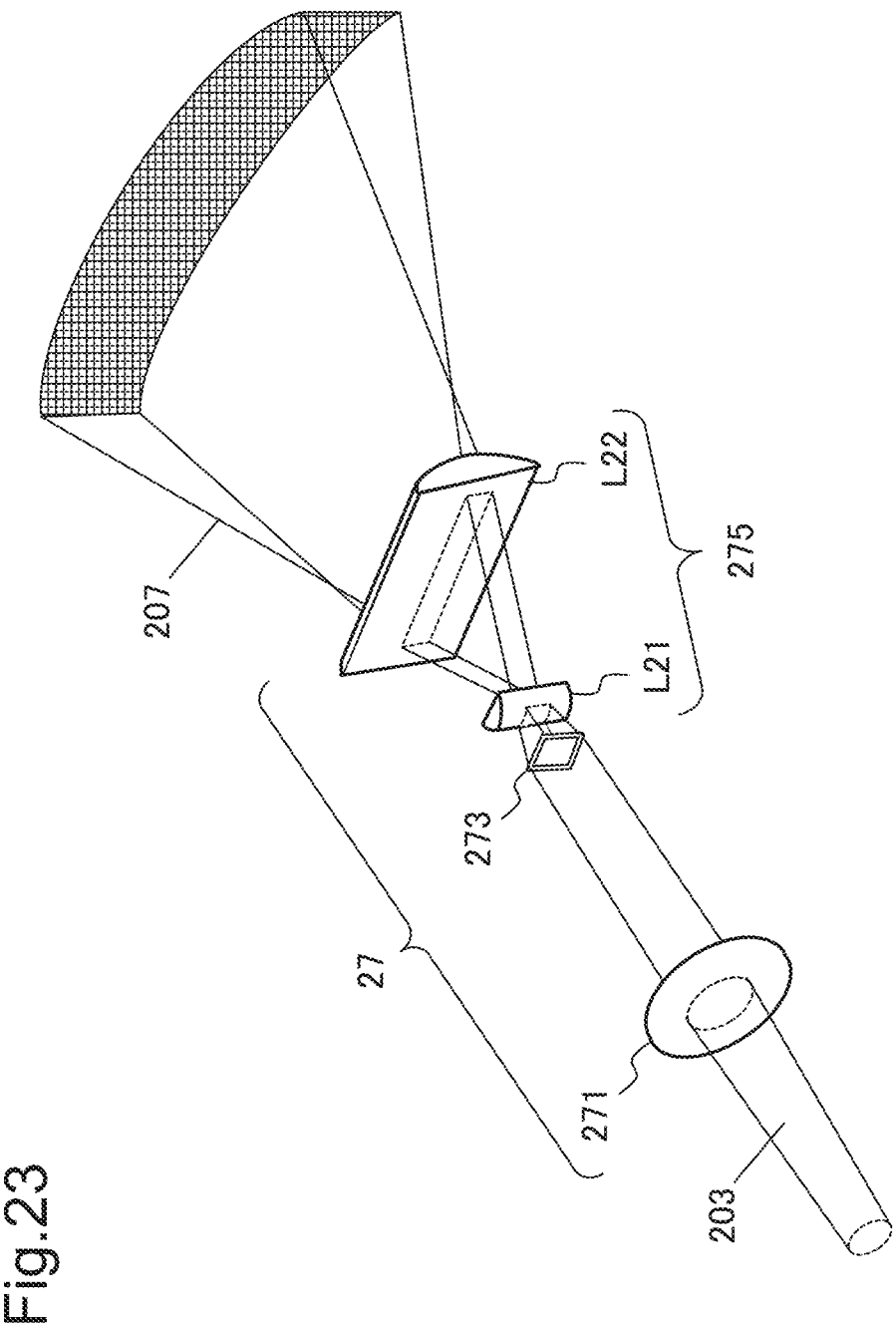
FIG. 23 is a conceptual diagram for explaining a con [FIG.] Figuration of a projection optical system of the projection device according to the second example embodiment.

The projection lens 275 is an optical lens that magnifies the light focused by the Fourier transform lens 271 at different magnification ratios in the horizontal direction and the vertical direction. In other words, the projection lens 275 changes the aspect ratio of an image formed by the phase image set in the modulation part 230 of the spatial light modulator 23 and projects the image. In the example of FIG. 23, the projection light 207 elongated in the horizontal direction is projected. The projection lens 275 includes a first lens L21 and a second lens L22.

FIG. 23 is a conceptual diagram for describing the projection lens 275. FIG. 23 is a view of projection optical system 27 viewed from obliquely above. The first lens L21 and the second lens L22 constituting the projection lens 275 are cylindrical lenses. FIG. 22 illustrates an example in which the projection lens 275 is configured by two cylindrical lenses, but the projection lens 275 may be configured by combining lenses equal to or more than three. Although FIG. 22 illustrates an example of combining plano-convex cylindrical lenses, the projection lens 275 may include a plano-concave lens. The projection lens 275 may include at least one cylindrical lens. The projection lens 275 may be configured by a single lens as long as the light can be enlarged at different magnification ratios in the horizontal direction and the vertical direction. For example, the projection lens 275 may be constructed with a free-form lens or a liquid crystal lens.

The first lens L21 has a columnar shape having a curvature center in a horizontal plane. The cylinder axis of the first lens L21 is perpendicular to the horizontal plane. The first lens L21 is disposed in such a way that a curved surface serves as an incident face and a flat face facing the curved surface serves as an emission face. The curved surface (incident face) of the first lens L21 is directed to the spatial light modulator 23. The flat face (emission face) of the first lens L21 faces the second lens L22. The light incident on the incident face of first lens L21 is enlarged in the horizontal plane and emitted from the emission face. The light emitted from the emission face of first lens L21 travels toward the incident face of the second lens L22.

The second lens L22 has a columnar shape having a curvature center in a face perpendicular to the horizontal plane. The cylinder axis of the second lens L22 is in a horizontal plane and is orthogonal to the cylinder axis of the first lens L21. The second lens L22 is disposed in such a way that the flat face opposed to the curved surface is an incident face and the curved surface is an emission face. The flat face (incident face) of the second lens L22 faces the first lens L21. The curved surface (emission face) of the second lens L22 is directed in the projection direction of projection light 207. The light incident on the incident face of the second lens L22 is compressed in the vertical direction in a face perpendicular to the horizontal plane, and is emitted from the emission face. The light emitted from the emission face of the second lens L22 is enlarged in the horizontal direction, compressed in the vertical direction, and projected as the projection light 207. That is, the light emitted from the emission face of the second lens L22 is magnified at different magnification ratios in the horizontal direction and the vertical direction, and projected as the projection light 207.

Figure 24:
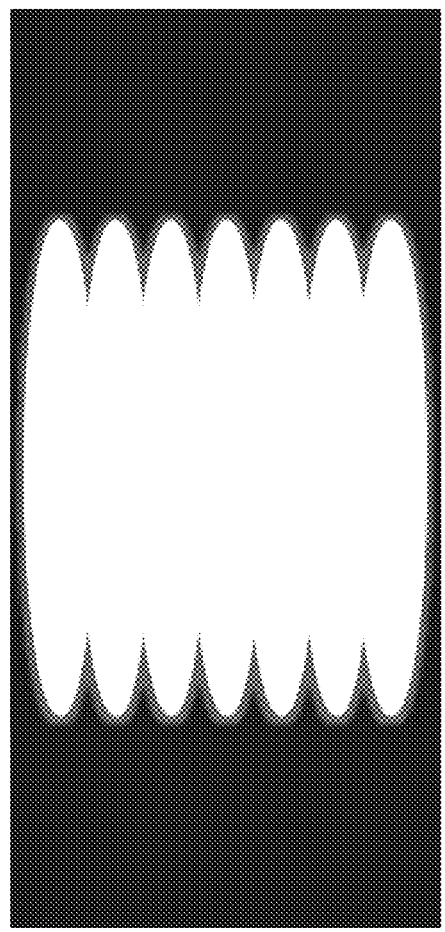
FIG. 24 is a conceptual diagram illustrating part of an image displayed by projection light projected in a case where tiles are set in the modulation part of the spatial light modulator of the projection device according to the second example embodiment under the condition of the first tiling example.

FIG. 24 is a conceptual diagram of part of an image displayed by the projection light 207 projected under the condition of the first tiling example (FIGS. 11 to 15) of the first example embodiment. In the example of FIG. 24, base dots derived from tiles each having 256×256 pixels (first resolution) are complemented by complementary dots derived from tiles each having 253×256 pixels (second resolution), and gaps between the base dots are filled. Further, in the example of FIG. 24, the combined dots of the base dots and the complementary dots are extended in the horizontal direction. As a result, the gaps between the base dots are complemented by the complementary dots, and the image that is stretched in the horizontal direction, and has no gap in the vertical direction is displayed. As described above, according to the present example embodiment, the image in which the gaps between the dots are filled is stretched in the uniaxial direction and displayed. That is, according to the present example embodiment, the gaps between the dots can be complemented two-dimensionally by complementing gaps between dots one-dimensionally in the vertical direction and enlarging the projection angle in the horizontal direction.

As described above, the projection device according to the present example embodiment includes the light source, the spatial light modulator, the control unit, and the projection optical system. The light source, the spatial light modulator, and the projection optical system constitute a projection unit. The light source emits parallel light. The spatial light modulator includes a modulation part that modulates the phase of the parallel light emitted from the light source. The control unit tiles the modulation part with tiles of at least two resolutions in which a phase image related to an image displayed by projection light being set. The control unit sets the phase image to each of the plurality of tiles that are tiled. The control unit sets, in the modulation part of the spatial light modulator, a plurality of tiles in which the number of pixels to in a direction perpendicular to a direction in which an image displayed by projection light projected by the projection lens is expanded is adjusted. The control unit causes the light source to radiate parallel light toward the modulation part in which the phase image is set. The projection optical system includes a projection lens that changes an aspect ratio of an image formed by the phase image set in the modulation part of the spatial light modulator and projects the image. The projection optical system projects light modulated by the spatial light modulator as projection light.

According to the projection device of the present example embodiment, the gaps between the dots can be complemented two-dimensionally by complementing gaps between dots one-dimensionally in the vertical direction and enlarging the projection angle in the horizontal direction. According to the projection device of the present example embodiment, by changing the combination and arrangement of the cylindrical lenses, it is possible to complement gaps between dots two-dimensionally by complementing gaps between dots one-dimensionally in the horizontal direction, and enlarging the projection angle in the vertical direction.

Third Example Embodiment

Next, a projection device according to a third example embodiment will be described with reference to the drawings. The projection device of the present example embodiment controls the projection direction of the projection light by adjusting the resolution of the tile set in the modulation part of the spatial light modulator.

(Configuration)

Figure 25:
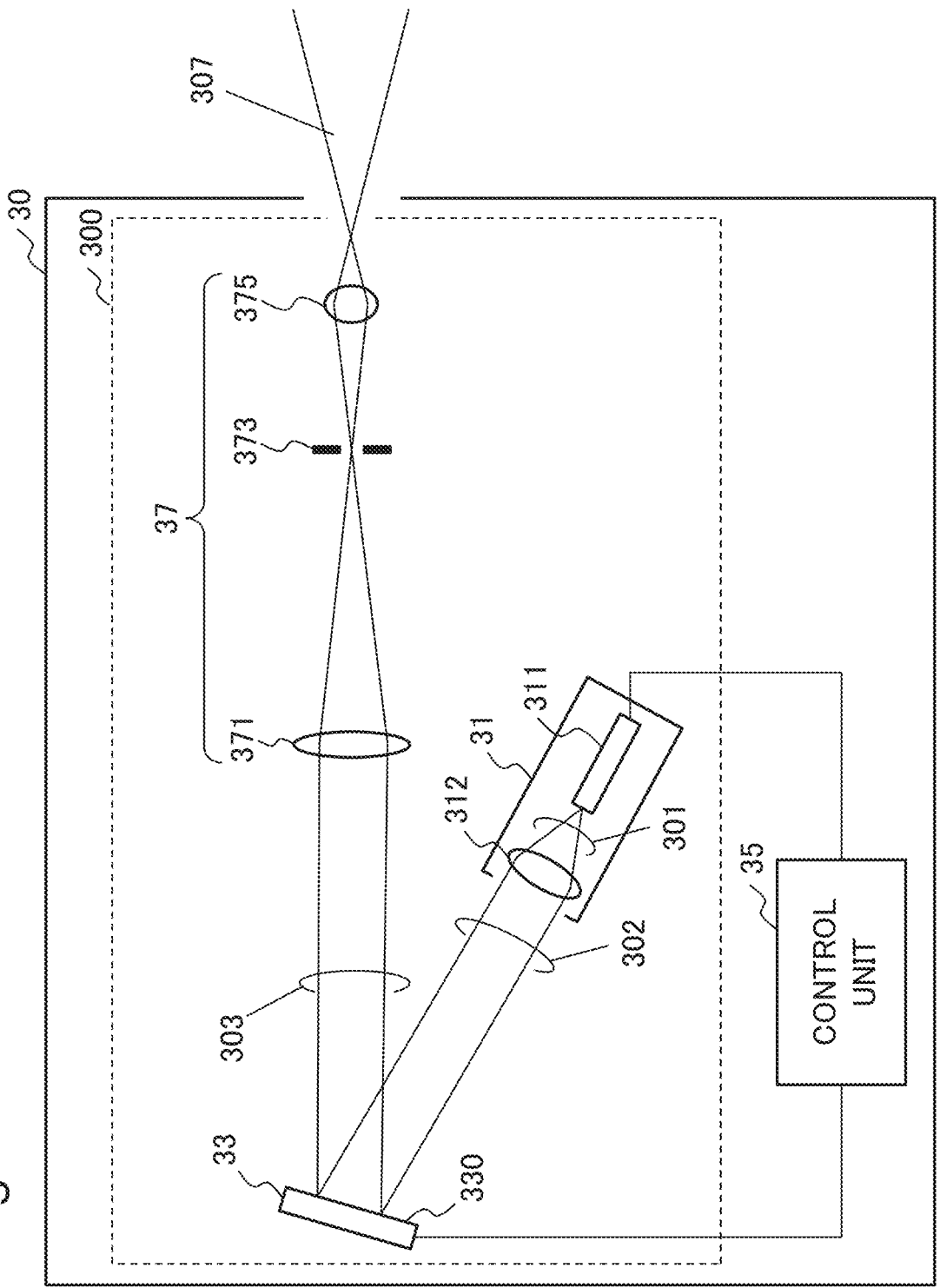
FIG. 25 is a conceptual diagram illustrating an example of a projection device according to a third example embodiment.

FIG. 25 is a conceptual diagram illustrating an example of a configuration of a projection device 30 of the present example embodiment. The projection device 30 includes a light source 31, a spatial light modulator 33, a control unit 35, and a projection optical system 37. The light source 31, the spatial light modulator 33, and the projection optical system 37 constitute a projection unit 300. FIG. 25 is a view of the internal configuration of the projection device 30 when viewed in a lateral direction. FIG. 25 illustrates a line indicating a trace of light. FIG. 25 is conceptual, and does not accurately represent the positional relationship between the components, the traveling direction of light, and the like.

The light source 31 includes an emitter 311 and a collimator 312. Each of the light source 31, the emitter 311, and the collimator 312 has a configuration similar to that of each of the light source 11, the emitter 111, and the collimator 112 of the first example embodiment. The emitter 311 emits laser light 301 in a predetermined wavelength band under the control of the control unit 35. The collimator 312 converts the laser light 301 emitted from the emitter 311 into parallel light 302. The laser light 301 emitted from the emitter 311 is converted into the parallel light 302 by the collimator 312, and emitted from the light source 31. The parallel light 302 emitted from the light source 31 travels toward a modulation part 330 of the spatial light modulator 33.

The spatial light modulator 33 includes the modulation part 330 irradiated with the parallel light 302. The spatial light modulator 33 has a configuration similar to that of the spatial light modulator 13 of the first example embodiment. The modulation part 330 of the spatial light modulator 33 is divided into regions (also referred to as tiling) according to the resolution of the image to be displayed. A pattern (also referred to as a phase image) related to an image to be displayed is set to each of the plurality of tiles set in the modulation part 330 under the control of the control unit 35.

The control unit 35 controls the light source 31 and the spatial light modulator 33. The control unit 35 has a configuration similar to that of the control unit 15 of the first example embodiment. The control unit 35 sets a phase image related to the projected image in the modulation part 330 in accordance with the tiling set in the modulation part 330 of the spatial light modulator 33. The control unit 35 drives the emitter 311 of the light source 31 in a state where the phase image related to the projected image is set in the modulation part 330. As a result, the parallel light 302 emitted from the light source 31 is radiated to the modulation part 330 of the spatial light modulator 33 in accordance with the timing at which the phase image is set in the modulation part 330 of the spatial light modulator 33. The parallel light 302 with which the modulation part 330 of the spatial light modulator 33 is irradiated is modulated by the modulation part 330 of the spatial light modulator 33. Modulated light 303 modulated by the modulation part 330 of the spatial light modulator 33 is projected as projection light 307 related to the pattern displayed on the modulation part 330 of the spatial light modulator 33.

The control unit 35 changes the projection direction of the projection light 307 by changing the resolution of the plurality of tiles set in the modulation part 330 of the spatial light modulator 33 under the condition that the same phase distribution is displayed. In other words, the control unit 35 changes the position where the image is displayed by changing the resolution of the plurality of tiles. For example, the control unit 35 changes the direction in which the projection light 307 is projected by switching the resolutions of the plurality of tiles set in the modulation part 330 from 256×256 pixels to 253×253 pixels.

Figure 26:
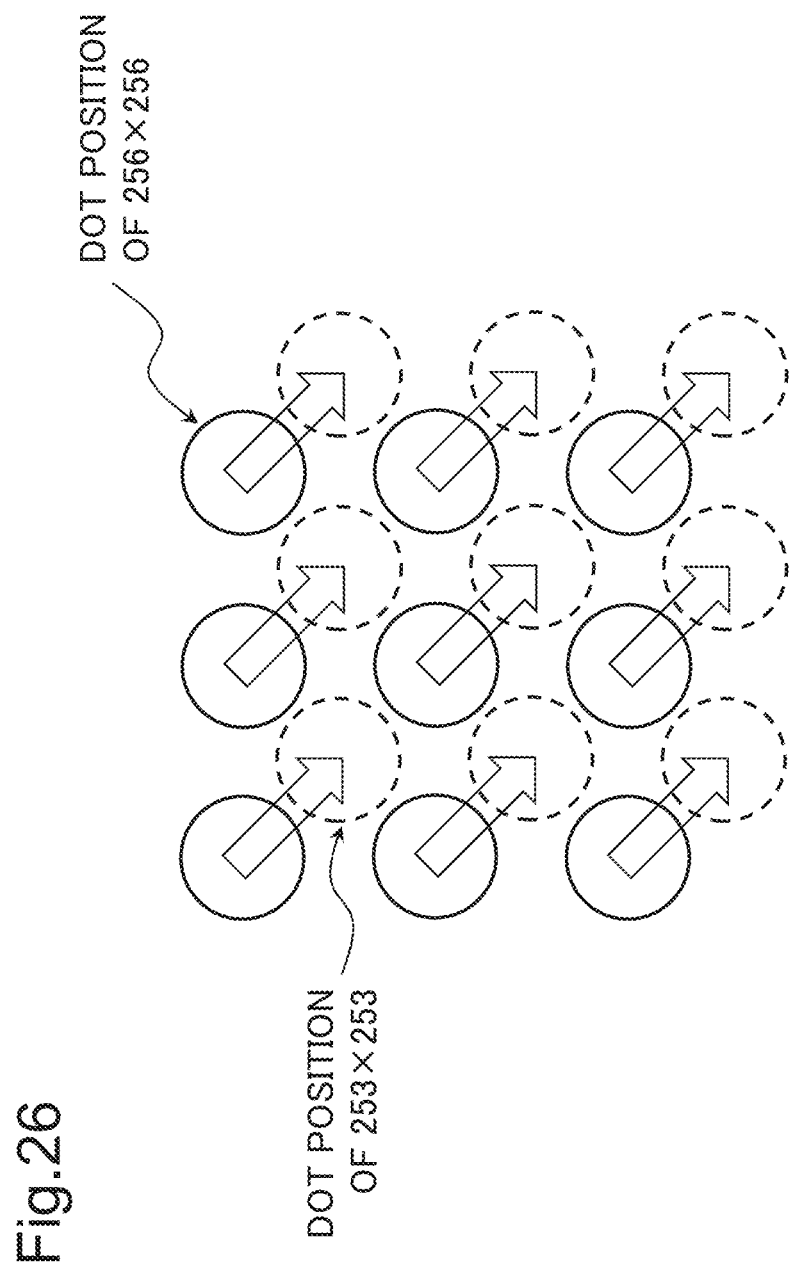
FIG. 26 is a conceptual diagram illustrating an example of changing positions of a plurality of dots constituting an image formed by projection light projected from a projection device according to the third example embodiment.

FIG. 26 is a conceptual diagram illustrating an example in which the position of the dot constituting the image is changed by switching the resolution of the plurality of tiles from 256×256 pixels to 253×253 pixels under the condition that the same phase distribution is displayed on each of the plurality of tiles allocated to the modulation part 330 of the spatial light modulator 33.

Figure 27A:
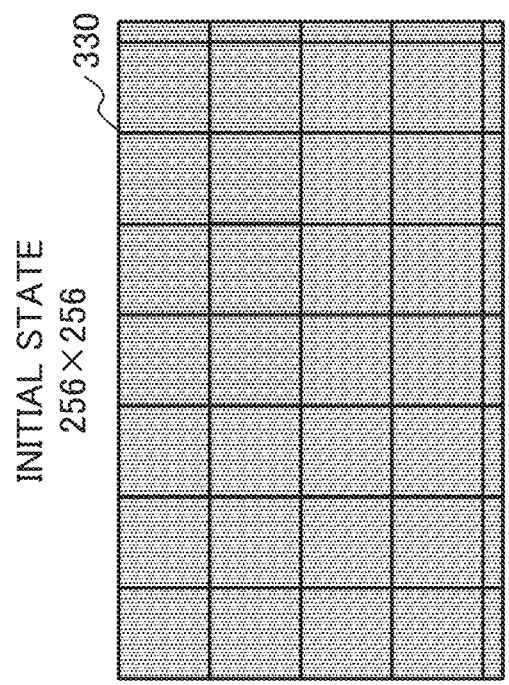
FIG. 27A is a conceptual diagram for describing an example of changing tiling of a modulation part of a spatial light modulator of the projection device according to the third example embodiment.
Figure 27B:
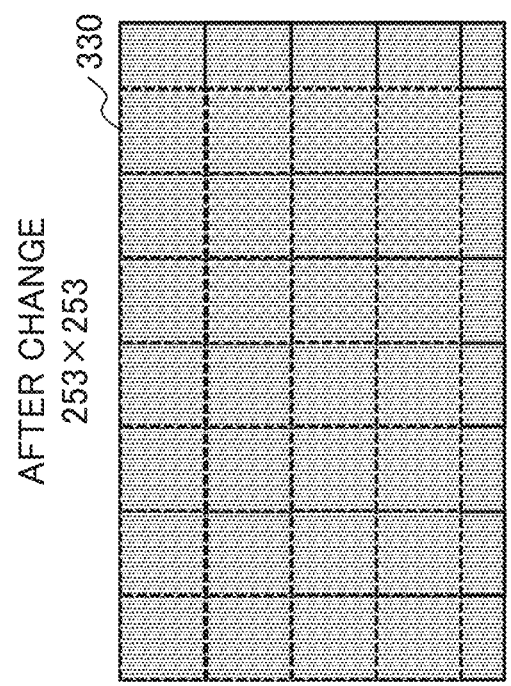
FIG. 27B is a conceptual diagram for describing an example of changing tiling of a modulation part of a spatial light modulator of the projection device according to the third example embodiment.

FIGS. 27A and 27B are examples in which the resolution is collectively changed in whole modulation part 330. By switching the resolution (256×256 pixels) in the initial state of FIG. 27A to the changed resolution (253×253 pixels) of FIG. 27B, the plurality of tiles as a whole moves to the upper left of the modulation part 330. In the example of FIGS. 27A and 27B, each pixel can be controlled by addressing in the entire modulation part 330 of the spatial light modulator 33. In the example of FIGS. 27A and 27B, a sufficient number of pixels is not allocated to the tiles at the right end and the lower end of the modulation part 330, but a similar phase image is set for the tiles. In the examples of FIGS. 27A and 27B, the plurality of tiles is disposed in the modulation part 330 starting from the left end, but the method of disposing the plurality of tiles in the modulation part 330 is not limited to the examples of FIGS. 27A and 27B.

For example, the control unit 35 changes a plurality of tiles in which phase images related to the same image are set to the same resolution. When the resolution is changed in this way, the position of the entire image displayed by the projection light 307 is changed. For example, when the resolution can be switched at a high speed to the extent that the time resolution of the device that detects the image formed by the projection light 307 is exceeded, the gap between the plurality of dots constituting the image is hardly detected.

For example, the control unit 35 changes each of a plurality of tiles in which phase images related to the same image are set to a different resolution. By changing the resolution in this way, gaps between dots constituting the image displayed by projection light 307 are complemented. For example, when the resolution can be switched with accuracy exceeding the spatial resolution of the device that detects the image formed by projection light 307, the gap between the plurality of dots constituting the image is hardly detected.

The projection optical system 37 is an optical system that projects the modulated light 303 modulated by the modulation part 330 of the spatial light modulator 33 as the projection light 307. The projection optical system 37 includes a Fourier transform lens 371, an aperture 373, and a projection lens 375. The Fourier transform lens 371, the aperture 373, and the projection lens 375 have configurations similar to those of the Fourier transform lens 171, the aperture 173, and the projection lens 175 of the first example embodiment.

As described above, the projection device according to the present example embodiment includes the light source, the spatial light modulator, the control unit, and the projection optical system. The light source, the spatial light modulator, and the projection optical system constitute a projection unit. The light source emits parallel light. The spatial light modulator includes a modulation part that modulates the phase of the parallel light emitted from the light source. The control unit tiles the modulation part with tiles of at least two resolutions in which a phase image related to an image displayed by projection light being set. The control unit sets the phase image to each of the plurality of tiles that are tiled. The control unit causes the light source to radiate parallel light toward the modulation part in which the phase image is set. The projection optical system projects light modulated by the spatial light modulator as projection light. The control unit changes the resolution of the plurality of tiles set in the modulation part of the spatial light modulator to change the display position of the image displayed by the projection light. For example, the control unit collectively changes the resolutions of the plurality of tiles set in the modulation part of the spatial light modulator. For example, the control unit changes the resolution inside the plurality of tiles set in the modulation part of the spatial light modulator.

According to the present example embodiment, the display position of the image displayed by the projection light can be changed by changing the resolution of the plurality of tiles set in the modulation part of the spatial light modulator.

In an aspect of the present aspect, the control unit changes a plurality of tiles in which the phase images related to the same image are set to the same resolution. According to the present aspect, by switching the resolution at a high speed to the extent that the time resolution of the device that detects the image formed by the projection light is exceeded, the gap between the plurality of dots constituting the image is hardly detected.

In an aspect of the present aspect, the control unit changes each of a plurality of tiles in which the phase images related to the same image are set to a different resolution. According to the present aspect, when the resolution is switched with an accuracy exceeding the spatial resolution of the device that detects the image formed by the projection light, the gap between the plurality of dots constituting the image is hardly detected.

Fourth Example Embodiment

Next, a projection device according to a fourth example embodiment will be described with reference to the drawings. The projection device of the present example embodiment has a configuration in which the projection devices of the first to third example embodiments are simplified.

(Configuration)

Figure 28:
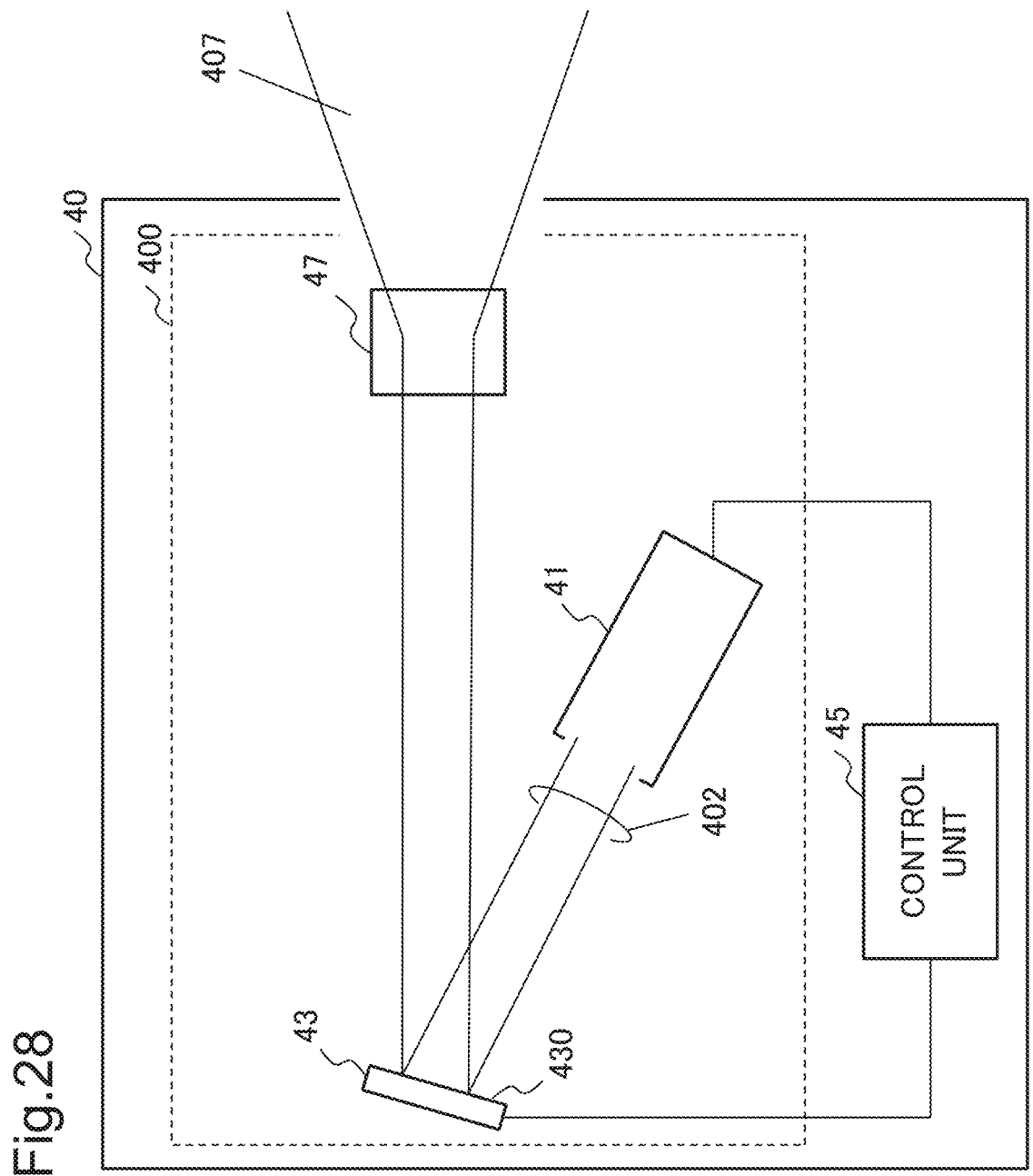
FIG. 28 is a conceptual diagram illustrating an example of a projection device according to a fourth example embodiment.

FIG. 28 is a block diagram illustrating an example of a configuration of a projection device 40 of the present example embodiment. The projection device 40 includes a light source 41, a spatial light modulator 43, a control unit 45, and a projection optical system 47. The light source 41, the spatial light modulator 43, and the projection optical system 47 constitute a projection unit 400. FIG. 28 is a view of the internal configuration of the projection device 40 when viewed in a lateral direction. FIG. 28 illustrates a line indicating a trace of light. FIG. 28 is conceptual, and does not accurately represent the positional relationship between the components, the traveling direction of light, and the like.

The light source 41 emits parallel light 402. The spatial light modulator 43 includes a modulation part 430 that modulates the phase of the parallel light 402 emitted from the light source. The control unit 45 tiles the modulation part 430 with tiles of at least two resolutions in which a phase image related to an image displayed by projection light 407 being set. The control unit 45 sets the phase image to each of the plurality of tiles that are tiled. The control unit 45 causes the light source 41 to radiate the parallel light 402 toward the modulation part 430 in which the phase image is set. The projection optical system 47 projects the light modulated by the spatial light modulator 43 as projection light 407.

According to the projection device of the present example embodiment, by adjusting the resolutions of the plurality of tiles set in the spatial light modulator, it is possible to complement gaps between the dots constituting the image displayed by the projection light without using the mechanism that operates mechanically.

(Hardware)

A hardware configuration for executing the processing of the control unit according to each example embodiment of the present disclosure will be described using a control device 90 of FIG. 29 as an example. For example, the control device 90 is achieved in the form of a microcomputer. The control device 90 in FIG. 29 is a configuration example for executing processing of the control unit of each example embodiment, and does not limit the scope of the present disclosure.

Figure 29:
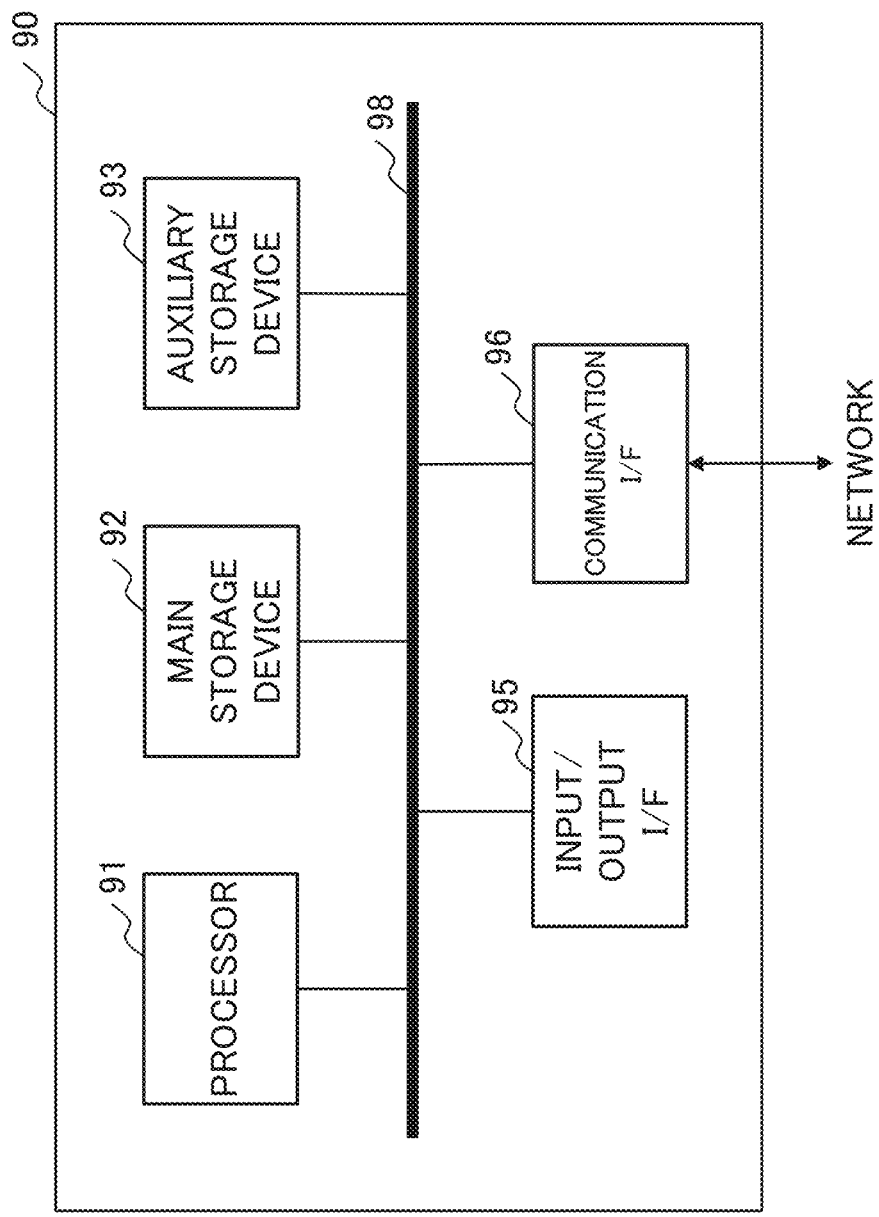
FIG. 29 is a block diagram illustrating an example of a hardware configuration that achieves a control unit of the projection device according to each example embodiment.

As illustrated in FIG. 29, the control device 90 includes a processor 91, a main storage device 92, an auxiliary storage device 93, an input/output interface 95, and a communication interface 96. In FIG. 29 the interface is abbreviated as an interface (I/F). The processor 91, the main storage device 92, the auxiliary storage device 93, the input/output interface 95, and the communication interface 96 are data-communicably connected to each other via a bus 98. The processor 91, the main storage device 92, the auxiliary storage device 93, and the input/output interface 95 are connected to a network such as the Internet or an intranet via the communication interface 96.

The processor 91 develops the program stored in the auxiliary storage device 93 or the like in the main storage device 92. The processor 91 executes the program developed in the main storage device 92. In the present example embodiment, a software program installed in the control device 90 may be used. The processor 91 executes processing by the control unit according to the present example embodiment.

The main storage device 92 has an area in which a program is developed. A program stored in the auxiliary storage device 93 or the like is developed in the main storage device 92 by the processor 91. The main storage device 92 is achieved by, for example, a volatile memory such as a dynamic random access memory (DRAM). A nonvolatile memory such as a magnetoresistive random access memory (MRAM) may be configured and added as the main storage device 92.

The auxiliary storage device 93 stores various pieces of data such as programs. The auxiliary storage device 93 is achieved by a local disk such as a hard disk or a flash memory. Various pieces of data may be stored in the main storage device 92, and the auxiliary storage device 93 may be omitted.

The input/output interface 95 is an interface that connects the control device 90 and a peripheral device based on a standard or a specification. The communication interface 96 is an interface that connects to an external system or a device through a network such as the Internet or an intranet in accordance with a standard or a specification. The input/output interface 95 and the communication interface 96 may be shared as an interface connected to an external device.

An input device such as a keyboard, a mouse, or a touch panel may be connected to the control device 90 as necessary. These input devices are used to input of information and settings. In a case where the touch panel is used as the input device, the display screen of the display device may also serve as the interface of the input device. Data communication between the processor 91 and the input device may be mediated by the input/output interface 95.

The control device 90 may be provided with a display device that displays information. When a display device is provided, the control device 90 preferably includes a display control device (not illustrated) for controlling display of the display device. The display device may be connected to the control device 90 via the input/output interface 95.

The control device 90 may be provided with a drive device. The drive device mediates reading of data and a program from a recording medium, writing of a processing result of the control device 90 to the recording medium, and the like between the processor 91 and the recording medium (program recording medium). The drive device may be connected to the control device 90 via the input/output interface 95.

The above is an example of a hardware configuration for enabling the control unit according to each example embodiment of the present invention. The hardware configuration of FIG. 29 is an example of a hardware configuration for executing the arithmetic processing of the control unit according to each example embodiment, and does not limit the scope of the present invention. A program for causing a computer to execute processing related to the control unit according to each example embodiment is also included in the scope of the present invention. A program recording medium in which the program according to each example embodiment is recorded is also included in the scope of the present invention. The recording medium can be achieved by, for example, an optical recording medium such as a compact disc (CD) or a digital versatile disc (DVD). The recording medium may be achieved by a semiconductor recording medium such as a Universal Serial Bus (USB) memory or a secure digital (SD) card. The recording medium may be achieved by a magnetic recording medium such as a flexible disk, or another recording medium. In a case where the program executed by the processor is recorded in the recording medium, the recording medium is a program recording medium.

The components of the control unit of each example embodiment may be combined in any components. The components of the control unit of each example embodiment may be achieved by software or may be achieved by a circuit.

While the present invention is described with reference to example embodiments thereof, the present invention is not limited to these example embodiments. Various modifications that can be understood by those skilled in the art can be made to the configuration and details of the present invention within the scope of the present invention.

This application claims priority based on Japanese Patent Application No. 2021 047562 filed on Mar. 22, 2021, the entire disclosure of which is incorporated herein.

REFERENCE SIGNS LIST 10, 20, 30, 40 projection device
11, 21, 31, 41 light source
13, 23, 33, 43 spatial light modulator
15, 25, 35, 45 control unit
17, 27, 37, 47 projection optical system
111, 211, 311 emitter
112, 212, 312 collimator
171, 271, 371 Fourier transform lens
173, 273, 373 aperture
175, 275, 375 projection lens

What is claimed is:

1. A projection device comprising:
a light source configured to emit parallel light;
a spatial light modulator including a modulation part that modulates a phase of the parallel light emitted from the light source;
a controller including
a memory storing instructions, and
a processor connected to the memory and configured to execute the instructions to
tile the modulation part with tiles of at least two resolutions in which a phase image related to an image displayed by projection light being set,
set the phase image to each of the plurality of tiles that are tiled, and
cause the light source to radiate the parallel light toward the modulation part in which the phase image is set; and
a projection optical system configured to project light modulated by the spatial light modulator as the projection light.

2. The projection device according to claim 1, wherein the processor is configured to execute the instructions to set, in the modulation part of the spatial light modulator, a plurality of tiles of a first resolution, each of the tiles of the first resolution having a same number of rows and columns, and a plurality of tiles of a second resolution, each of the tiles of the second resolution having a different number of rows from the each of the tiles of the first resolution.

3. The projection device according to claim 1, wherein the processor is configured to execute the instructions to set, in the modulation part of the spatial light modulator, a plurality of tiles of a first resolution, each of the tiles of the first resolution having a same number of rows and columns, and a plurality of tiles of a third resolution, each of the tiles of the third resolution having a different number of columns from the each of the tiles of the first resolution.

4. The projection device according to claim 1, wherein the processor is configured to execute the instructions to set, in the modulation part of the spatial light modulator, a plurality of tiles of a first resolution, each of the tiles of the first resolution having a same number of rows and columns, a plurality of tiles of a second resolution, each of the tiles of the second resolution having a different number of rows from the each of the tiles of the first resolution, a plurality of tiles of a third resolution, each of the tiles of the third resolution having a different number of columns from the each of the tiles of the first resolution, and a plurality of tiles of a fourth resolution, each of the tiles of the fourth resolution having a different number of rows and a different number of columns from the each of the tiles of the first resolution.

5. The projection device according to claim 1, wherein the projection optical system
includes a projection lens that changes an aspect ratio of an image formed by the phase image set in the modulation part of the spatial light modulator and projects the image, and
the processor is configured to execute the instructions to set, in the modulation part of the spatial light modulator, a plurality of tiles whose number of pixels in a direction perpendicular to a direction in which an image displayed by the projection light projected by the projection lens is expanded is adjusted.

6. The projection device according to claim 1, wherein the processor is configured to execute the instructions to change resolutions of a plurality of tiles set in the modulation part of the spatial light modulator to change a display position of an image displayed by the projection light.

7. The projection device according to claim 6, wherein the processor is configured to execute the instructions to change a plurality of tiles in which the phase image related to a same image is set to a same resolution.

8. The projection device according to claim 6, wherein the processor is configured to execute the instructions to change each of a plurality of tiles in which the phase image related to a same image is set to a different resolution.

9. A control method by a computer, the method comprising:
tiling a modulation part of a spatial light modulator with tiles of at least two resolutions in which a phase image related to an image displayed by projection light being set;
setting the phase image to each of the plurality of tiles that are tiled; and
causing a light source to radiate parallel light toward the modulation part in which the phase image is set.

10. A non-transitory recording medium recording a program that causes a computer to execute:
processing of tiling a modulation part of a spatial light modulator with tiles of at least two resolutions in which a phase image related to an image displayed by projection light being set;
processing of setting the phase image to each of the plurality of tiles that are tiled; and
processing of causing a light source to radiate parallel light toward the modulation part in which the phase image is set.

* * * * *